United States Patent
Choi et al.

(10) Patent No.: US 12,455,228 B2
(45) Date of Patent: Oct. 28, 2025

(54) SEMICONDUCTOR MEASUREMENT APPARATUS

(71) Applicant: Samsung Electronics Co., Ltd., Suwon-si (KR)

(72) Inventors: Garam Choi, Suwon-si (KR); Wookrae Kim, Suwon-si (KR); Jinseob Kim, Suwon-si (KR); Jinyong Kim, Suwon-si (KR); Sungho Jang, Suwon-si (KR); Daehoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 18/154,990

(22) Filed: Jan. 16, 2023

(65) Prior Publication Data

US 2023/0400404 A1 Dec. 14, 2023

(30) Foreign Application Priority Data

Jun. 10, 2022 (KR) .................. 10-2022-0070451

(51) Int. Cl.
*G01N 21/21* (2006.01)
*G01B 11/24* (2006.01)

(52) U.S. Cl.
CPC ............. *G01N 21/21* (2013.01); *G01B 11/24* (2013.01); *G01B 2210/56* (2013.01)

(58) Field of Classification Search
CPC ...... G06T 7/62; G01N 21/9501; G01N 21/21; G03F 7/70625; H01L 22/12; G01B 11/24;

(Continued)

(56) References Cited

U.S. PATENT DOCUMENTS

| 8,730,465 B2 | 5/2014 | Endo et al. |
| 9,551,939 B2 | 1/2017 | Mathijssen et al. |

(Continued)

FOREIGN PATENT DOCUMENTS

| KR | 20210030974 A | 3/2021 |
| KR | 20210129077 A | 10/2021 |

*Primary Examiner* — Tarifur R Chowdhury
*Assistant Examiner* — Joshua M Carlson
(74) *Attorney, Agent, or Firm* — Wolf, Greenfield & Sacks, P.C.

(57) ABSTRACT

A semiconductor measurement apparatus includes an illumination unit including a light source and at least one illumination polarization element, a light receiving unit including at least one light-receiving polarization element disposed on a path of light reflected by a sample, and an image sensor positioned to receive light passing through the at least one light-receiving polarization element and configured to output an original image, and a control unit configured to determine, by processing the original image, a selected critical dimension among critical dimensions of a structure included in a region of the sample. The control unit is configured to obtain a plurality of sample images by selecting regions of the original image in which a peak due to interference appears, to determine a plurality of elements included in a Mueller matrix using the plurality of sample images, and to determine the selected critical dimension based on the plurality of elements.

12 Claims, 18 Drawing Sheets

(58) Field of Classification Search
CPC .. G01B 2210/56; G01B 11/2441; G01B 11/00
See application file for complete search history.

(56) References Cited

U.S. PATENT DOCUMENTS

| | | | |
|---|---|---|---|
| 9,970,747 | B2 | 5/2018 | Kreuzer et al. |
| 10,533,940 | B2 | 1/2020 | Manassen et al. |
| 11,193,882 | B2 | 12/2021 | Hidaka |
| 11,346,768 | B1* | 5/2022 | James ................. G03F 7/70625 |
| 2008/0049233 | A1 | 2/2008 | De Groot |
| 2015/0285735 | A1* | 10/2015 | Wang ................... G01N 21/956 |
| | | | 356/369 |
| 2020/0041563 | A1 | 2/2020 | Tinnemans et al. |
| 2021/0242060 | A1* | 8/2021 | Krishnan ............. G01N 21/211 |
| 2022/0003535 | A1 | 1/2022 | Hidaka |
| 2022/0003538 | A1* | 1/2022 | Hidaka .................... G02B 5/04 |
| 2022/0216119 | A1 | 7/2022 | Takahashi et al. |

* cited by examiner

SEMICONDUCTOR MEASUREMENT APPARATUS

CROSS-REFERENCE TO RELATED APPLICATION(S)

This application claims benefit of priority to Korean Patent Application No. 10-2022-0070451, filed on Jun. 10, 2022 in the Korean Intellectual Property Office, the disclosure of which is incorporated herein by reference in its entirety.

BACKGROUND

Example embodiments of the present disclosure relate to a semiconductor measurement apparatus.

A semiconductor measurement apparatus may be an apparatus for measuring a critical dimension of a structure in a sample including a structure formed by a semiconductor process, and generally, a semiconductor measurement apparatus may measure a critical dimension using ellipsometry. Generally, the ellipsometric method may be to irradiate light to a sample at a fixed azimuth and incidence angle and to determine a critical dimension of a structure included in the light-irradiated region of the sample using spectral distribution of light reflected from the sample. As a critical dimension of a structure formed by a semiconductor process has gradually decreased, the effect of changes in a critical dimension other than a critical dimension to be measured on spectral distribution may increase, and accordingly, the critical dimension to be measured may not be accurately determined with the spectral distribution obtained from ellipsometry.

SUMMARY

An example embodiment of the present disclosure is to provide a semiconductor measurement apparatus which may, by obtaining data necessary for determining a critical dimension in overall azimuths and a wide range of incidence angles by imaging once, and determining a critical dimension using parameters other than intensity difference and phase difference of a polarization component of light, accurately determine a selected critical dimension despite interaction between different critical dimensions.

According to an example embodiment of the present disclosure, a semiconductor measurement apparatus includes an illumination unit including a light source and at least one illumination polarization element disposed on a path of light emitted by the light source, a light receiving unit including at least one light-receiving polarization element disposed on a path of light passing through the at least one illumination polarization element and reflected by a sample, and an image sensor positioned to receive light passing through the at least one light-receiving polarization element and configured to output an original image, and a control unit configured to determine, by processing the original image, a selected critical dimension among critical dimensions of a structure included in a region of the sample to which light is incident, wherein the control unit is configured to obtain a plurality of sample images by selecting regions of the original image in which a peak due to interference appears, to determine a plurality of elements included in a Mueller matrix using the plurality of sample images, and to determine the selected critical dimension based on the plurality of elements.

According to an example embodiment of the present disclosure, a semiconductor measurement apparatus includes an image sensor configured to receive light passing through a plurality of polarization elements and reflected by a sample, and to output multi-interference images representing interference patterns of polarization components of light, an optical unit disposed above a path through which the image sensor receives light and including an objective lens disposed on the sample, and a control unit configured to obtain, by processing the multi-interference image, a degree of polarization determined from the polarization components at each of a plurality of azimuths defined on a plane perpendicular to a path of light incident to the image sensor, wherein the control unit is configured to determine a selected critical dimension to be measured from a structure included in the sample based on the degree of polarization.

According to an example embodiment of the present disclosure, a semiconductor measurement apparatus includes an illumination system configured to irradiate light to a sample while changing a wavelength band, an optical system disposed on a path through which light is reflected by the sample and incident to an image sensor, and including a plurality of beam displacers configured to decompose light into a plurality of polarization components, and a controller configured to determine elements of a Mueller matrix representing the plurality of polarization components based on a multi-interference image generated by the image sensor receiving the plurality of polarization components, wherein the controller is configured to select at least one element from among the elements, and to determine a critical dimension of a structure included in a region of the sample to which light is irradiated using spectral data corresponding to distribution of the at least one element according to the wavelength band.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Hereinafter, embodiments of the present disclosure will be described with reference to the accompanying drawings.

Figure 1:
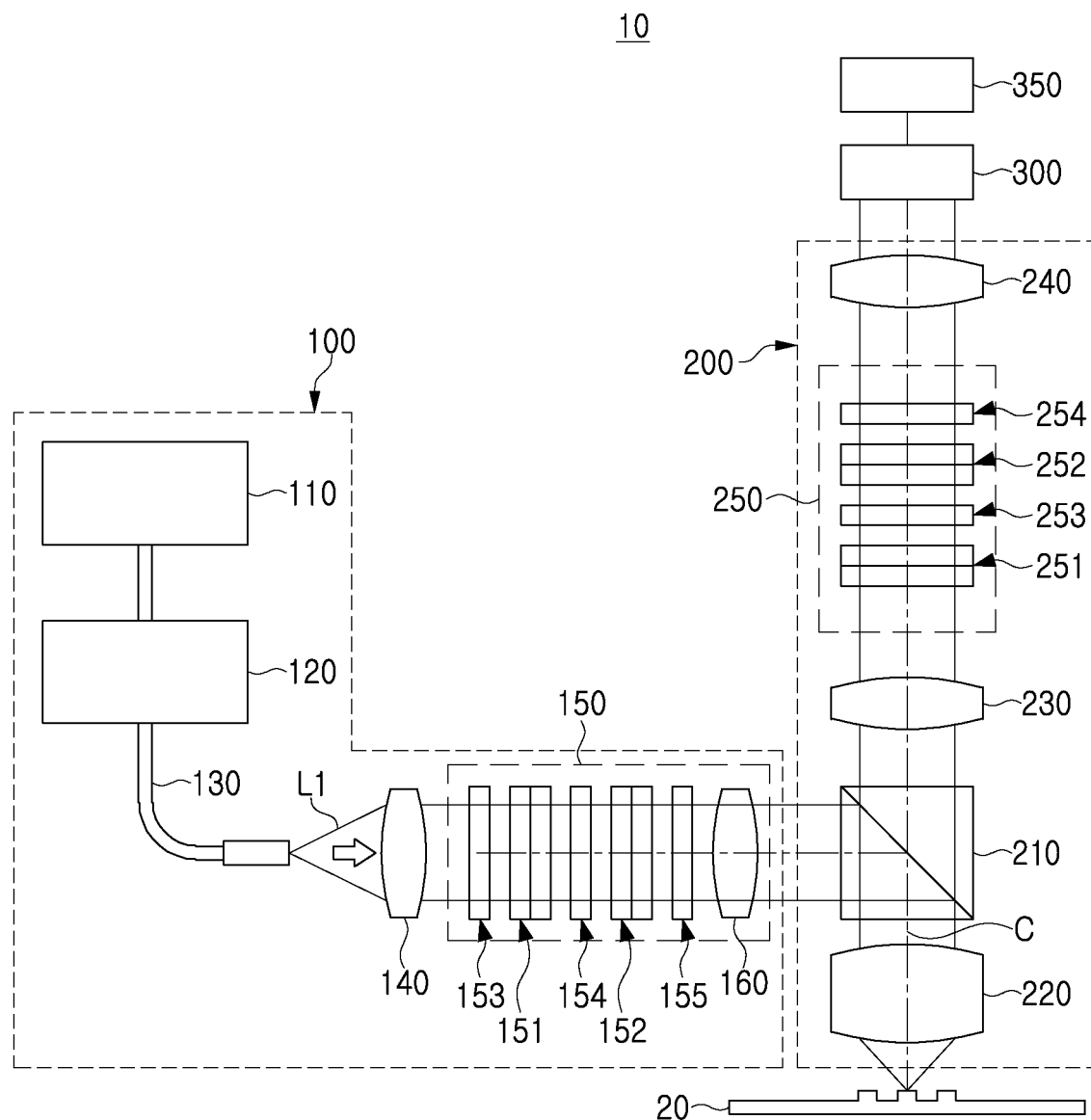
FIG. 1 is a diagram illustrating a semiconductor measurement apparatus according to an example embodiment of the present disclosure.

FIG. 1 is a diagram illustrating a semiconductor measurement apparatus according to an example embodiment.

Referring to FIG. 1, a semiconductor measurement apparatus 10 according to an example embodiment may be an apparatus using an elliptic measurement method. As illustrated in FIG. 1, the semiconductor measurement apparatus 10 may include an illumination unit or illumination system 100, an optical unit or optical system 200, an image sensor 300, and a control unit or control system or controller 350. The semiconductor measurement apparatus 10 may generate an image by receiving reflected light irradiated to a sample 20 by the illumination unit 100, and may measure a critical dimension of a structure included in the sample 20 by analyzing the image.

The illumination unit 100 may include a light source 110, a monochromator 120, a fiber 130, illumination lenses 140 and 160, and an illumination polarization element, unit, or system 150. The light source 110 may output light incident to the sample 20, and the light may include an ultraviolet wavelength band to an infrared wavelength band, or may be monochromatic light having a specific wavelength in example embodiments. The monochromator 120 may select and emit a predetermined wavelength band from light emitted by the light source 110. In an example embodiment, the monochromator 120 may irradiate light to the sample 20 while changing a wavelength band of the light emitted by the light source 110, such that light of a wide wavelength band may be irradiated to the sample 20.

The fiber 130 may be a light guide member having a cable shape, and light incident to the fiber 130 may be irradiated to a first illumination lens 140. The first illumination lens 140 may be a convex lens, and may adjust distribution of an angle of light irradiated by the fiber 130 and may allow light to be incident to the illumination polarization unit 150. For example, the first illumination lens 140 may convert light emitted by the fiber 130 into parallel light.

The illumination polarization unit 150 may polarize light passing through the first illumination lens 140 in a predetermined polarization direction to be incident to the sample 20. In an example embodiment, the illumination polarization element 150 may include at least one illumination polarization element 151-153, and wave plates 154 and 155. For example, the illumination polarization element 150 may include a first illumination polarization element or polarizer 151, a second illumination polarization element or polarizer 152, and a third illumination polarization element or polarizer 153. Each of the first illumination polarization element 151 and the second illumination polarization element 152 may include a pair of beam displacers, and the third illumination polarization element 153 may be implemented as a polarizer.

The wave plates 154 and 155 may be implemented as a half wave plate, a quarter wave plate, and the number of the illumination polarization elements 151-153 and the number of the wave plates 154 and 155 may be varied. For example, each of the first illumination polarization element 151 and the second illumination polarization element 152 among the illumination polarization elements 151-153 may be implemented as at least one of a Nomarski prism, a Wollaston prism, and a lotion prism. The third illumination polarization element 153 may polarize light in a polarization direction inclined by 45 degrees with respect to the ground. Light passing through the illumination polarization element 150 may be incident to the beam splitter 210 of the optical unit 200 through the second illumination lens 160 which may be implemented as a convex lens.

The optical unit 200 may be included in a light receiving unit or system together with the image sensor 300. The beam splitter 210 of the optical unit 200 may reflect a portion of light received from the illumination unit 100 and may transmit a portion of the light. Light passing through the beam splitter 210 may be incident to the objective lens 220, and light passing through the objective lens 220 may be incident to the sample 20. For example, light passing through the objective lens 220 may be incident to be focused on a target region of the sample 20.

When light passing through the objective lens 220 is reflected in the target region of the sample 20, the objective lens 220 may receive the reflected light again. In the example embodiment illustrated in FIG. 1, the optical axis C of light incident to and reflected by the sample 20 may be perpendicular to the surface of the sample 20.

Light irradiated to the sample 20 may include linearly polarized light in a specific direction. Light including linearly polarized light may be focused and may be incident to the target region of the sample 20, and light may include a P-polarization component and an S-polarization component depending on an incidence angle determined based on the surface of the sample 20. In light incident to the sample 20, the P-polarization component may be reflected back as a P-polarization component, and the S-polarization component may be reflected back as an S-polarization component.

Light reflected by the sample 20 may pass through the objective lens 220 and the beam splitter 210, the first relay lens 230, the light-receiving polarization element, unit, or system 250, and the second relay lens 240 in sequence and may be incident to the image sensor 300. The first relay lens 230 may collect light passing through the beam splitter 210 and may form an image, and allow the light to be incident to the light-receiving polarization element 250.

The light-receiving polarizing unit 250 may include at least one light-receiving polarization element 251, 252, a wave plate 253, and an analyzer 254. The first light-receiving polarization element or polarizer 251 and the second light-receiving polarization element or polarizer 252 may polarize light passing through the first relay lens 230, and each of the first light-receiving polarization element 251 and the second light-receiving polarization element 252 may include a pair of beam displacers. The wave plate 253 may be implemented as a half-wave plate similarly to the wave plates 154 and 155 included in the illumination unit 100. Light passing through the light-receiving polarization element 250 may be incident to the image sensor 300 through the second relay lens 240.

Each of the first and second illumination polarization elements 151 and 152 and the first and second light-receiving polarization elements 251 and 252 may divide the incident light into a first polarization component and a second polarization component. For example, the first illumination polarization element 151 may divide incident light into a first polarization component and a second polarization component, and may allow the first polarization component and the second polarization component to be emitted by moving an optical axis of each of the first polarization component and the second polarization component. The second illumination polarization element 152 may divide light passing through the first illumination polarization element 151 and polarized by 45 degrees by a half-wave plate into a first polarization component and a second polarization component.

Accordingly, a plurality of polarization components generated by the first and second illumination polarization elements 151 and 152 and the first and second light-receiving polarization elements 251 and 252 may be incident to the image sensor 300 while interfering with each other, and accordingly, the image sensor 300 may generate a multi-interference image as an original image. The image sensor 300 may output an original image to the control unit 350, and the control unit 350 may determine a critical dimension of a structure included in a region of the sample 20 irradiated with light by processing the original image.

For example, the control unit 350 may perform frequency-transformation of the original image and may select regions in which a peak due to interference between a plurality of polarization components appears. The control unit 350 may obtain a plurality of sample images by frequency-inverse transformation of each of the selected regions, and may determine a plurality of elements included in an N×N matrix using the plurality of sample images. For example, the matrix may be a Mueller matrix, and N may be determined according to the number of polarization elements included in the semiconductor measurement apparatus 10. In the example embodiment illustrated in FIG. 1, the illumination unit 100 may include the first and second illumination polarization elements 151 and 152, and the optical unit 200 may include the first and second light-receiving polarization elements 251 and 252, such that the control unit 350 may generate a plurality of elements included in the 4×4 matrix.

Using the above method, the semiconductor measurement apparatus 10 may accurately determine a selected critical dimension to be measured among the critical dimensions of the structure of the sample 20. Generally, a critical dimension of the structure may be determined using spectral distribution according to a wavelength of light reflected by the sample 20, and in this case, due to an interaction action in which the selected critical dimension to be determined and the other critical dimensions affect the spectral distribution, it may be difficult to accurately measure the selected critical dimension.

In an example embodiment, a plurality of elements included in a Mueller matrix may be determined using a plurality of sample images extracted from an original image, and the selected critical dimension may be determined using the determined elements. Accordingly, the influence of the other critical dimensions may be reduced, performance of the semiconductor measurement apparatus 10 may improve, and further, a yield of the semiconductor process may improve.

FIGS. 2 to 5 are diagrams illustrating a method of operating a semiconductor measurement apparatus according to an example embodiment.

FIGS. 2 to 5 may be diagrams illustrating a portion of regions of semiconductor devices 400 (400A-400C) corresponding to a sample of a semiconductor measurement apparatus according to an example embodiment. The semiconductor devices 400 (400A-400C) may include a plurality of semiconductor devices.

Figure 2:
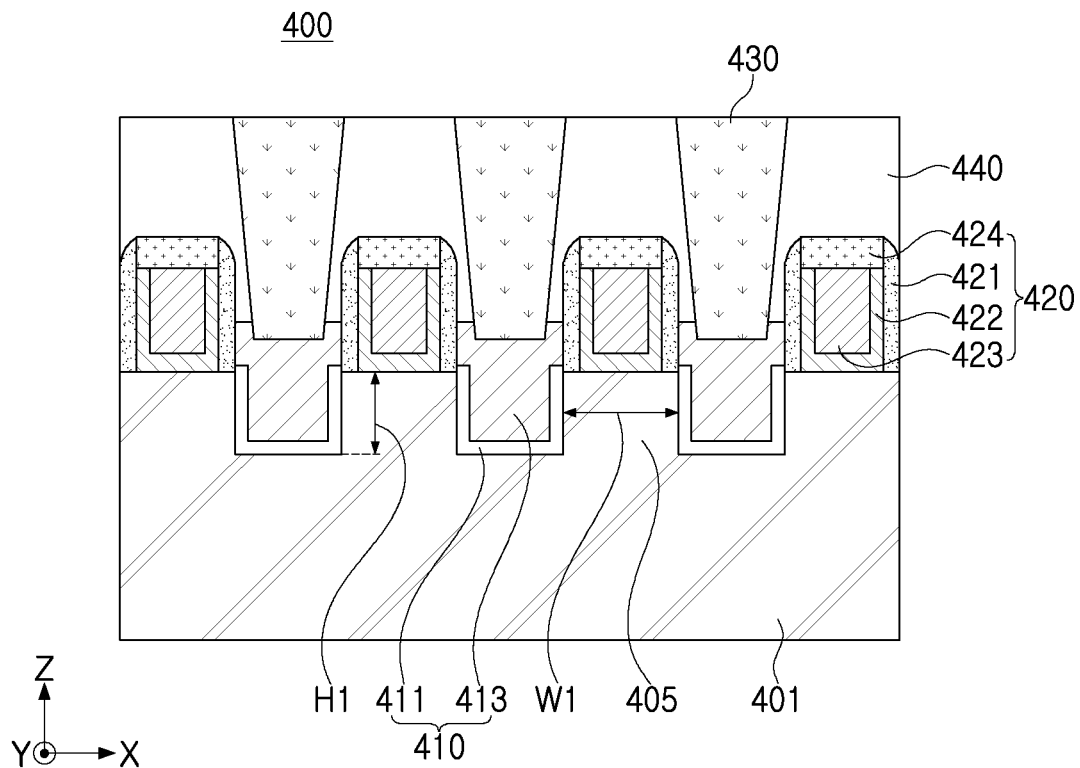
FIGS. 2 to 5 are diagrams illustrating a method of operating a semiconductor measurement apparatus according to an example embodiment of the present disclosure.

Referring first to FIG. 2, a semiconductor device 400 may include a substrate 401, source/drain regions 410, gate structures 420, source/drain contacts 430, and an interlayer insulating layer 440. However, the diagram illustrates a portion of regions of the semiconductor device 400, and the semiconductor device 400 may further include wiring patterns, gate contacts, a plurality of pad regions, and guard patterns.

The substrate 401 may include a semiconductor material, and a plurality of fin structures 405 protruding in the Z-axis direction perpendicular to the upper surface of the substrate 401 may be formed on the substrate 401. The plurality of fin structures 405 may be connected to the source/drain regions 410 on both sides in the X-axis direction, and may be in contact with the gate structures 420 in the Y-axis direction and the Z-axis direction. Each of the plurality of fin structures 405 may have a predetermined height and width, and may provide a channel region.

Each of the source/drain regions 410 may include a first source/drain layer 411 and a second source/drain layer 413. The first source/drain layer 411 may be in direct contact with the substrate 401 and the plurality of fin structures 405, and the second source/drain layer 413 may be formed by a selective epitaxial growth process using the first source/drain layer 411. The second source/drain layer 413 may be connected to the source/drain contacts 430. The source/drain contacts 430 may be disposed in the interlayer insulating layer 440 and may be formed of a material such as a metal or a metal silicide. In example embodiments, the source/drain contacts 430 may include a plurality of layers formed of different materials.

Each of the plurality of gate structures 420 may include a gate spacer 421, a gate insulating layer 422, a gate electrode layer 423, and a capping layer 424. For example, a semiconductor device may be provided by one of the plurality of gate structures 420 and the source/drain regions 410 on both sides thereof.

In the example embodiment illustrated in FIG. 2, the plurality of fin structures 405 may have a first height H1 and a first width W1. A first height H1 or a first width W1 among critical dimensions of the plurality of fin structures 405 may be measured using the semiconductor measurement apparatus according to an example embodiment.

However, the height and width of the plurality of fin structures 405 may be varied depending on characteristics of the semiconductor device 400. Also, a change in width of the plurality of fin structures 405 may affect a spectral distribution for measuring the height of the plurality of fin structures 405. Accordingly, when the semiconductor measurement apparatus obtains he spectral distribution to measure the heights of the plurality of fin structures 405, the spectral distribution obtained to measure the heights using changes in widths of the plurality of fin structures 405 may not be accurately formed, and accordingly, an error may occur in the measurement.

Figure 3:
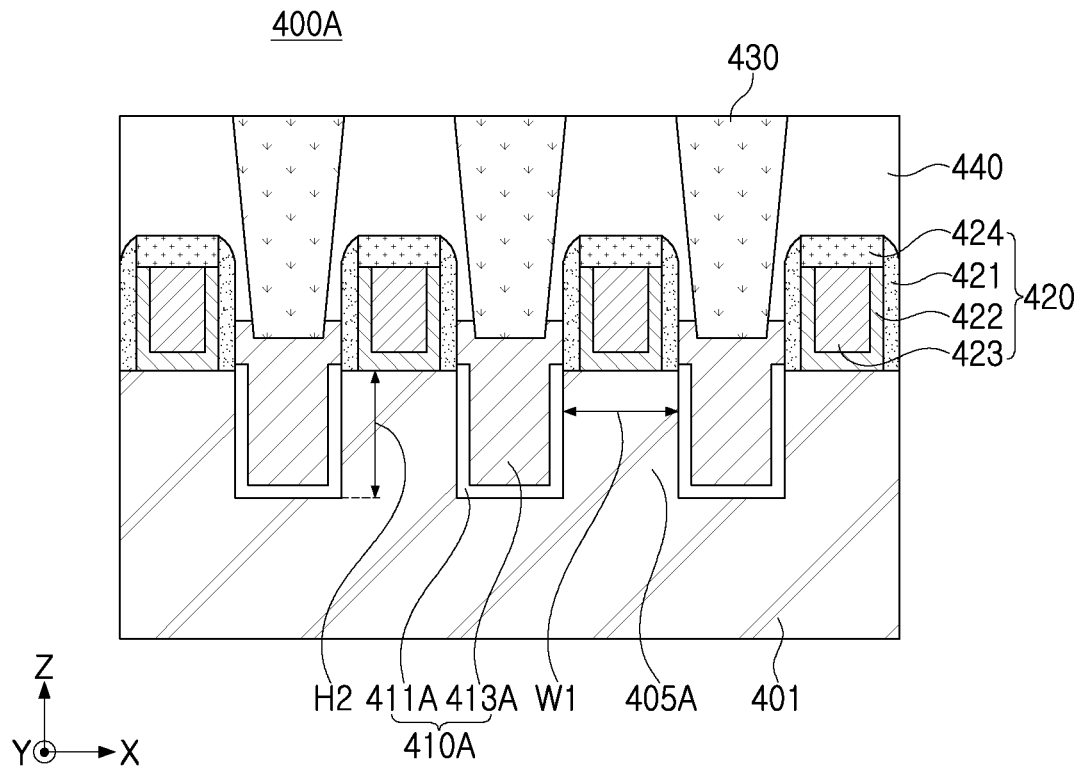

In the example embodiment illustrated in FIG. 3, the semiconductor device 400A may include a plurality of fin structures 405A having a height greater than that of the semiconductor device 400 in the example embodiment illustrated in FIG. 2. Referring to FIG. 3, the plurality of fin structures 405A may have a second height H2 greater than the first height H1, and accordingly, the shapes of the source/drain regions 410A may change.

Figure 4:
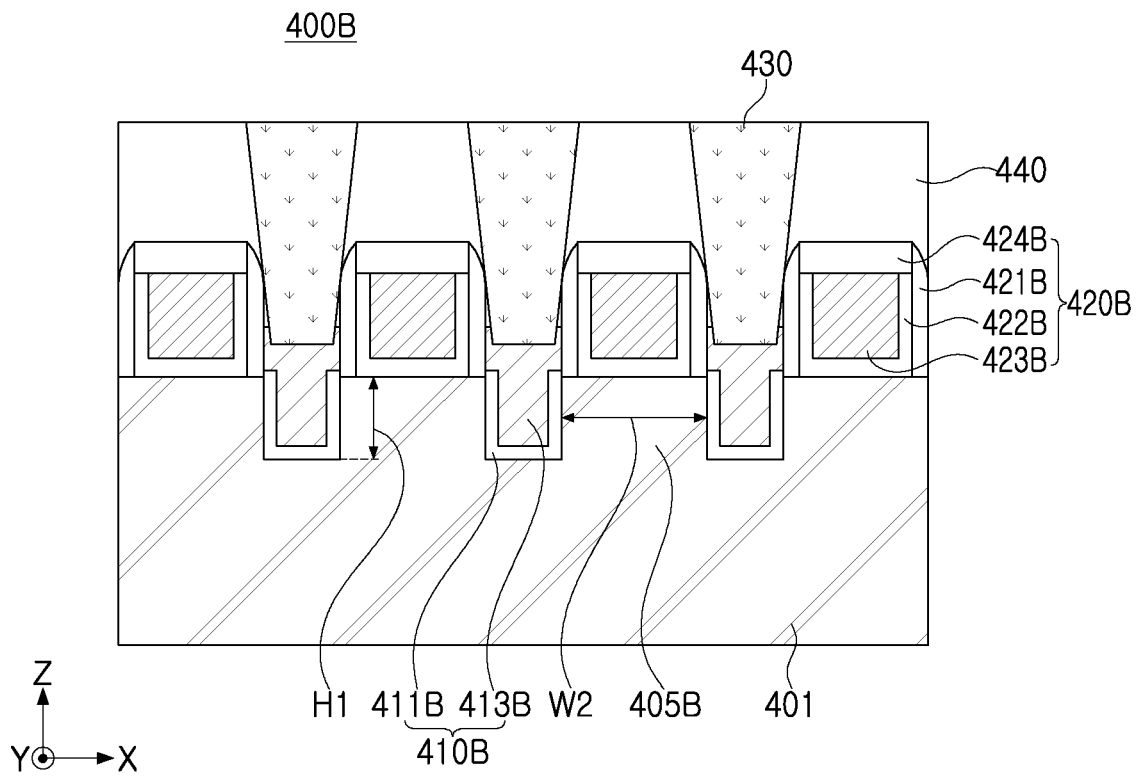

Referring to FIG. 4, the semiconductor device 400B may include a plurality of fin structures 405B having an equal or greater height and a greater width than those of the semiconductor device 400 in the example embodiment illustrated in FIG. 2. Referring to FIG. 4, the plurality of fin structures 405B may have a second width W2 greater than the first width W1, and accordingly, the shapes of the source/drain regions 410B may change.

Figure 5:
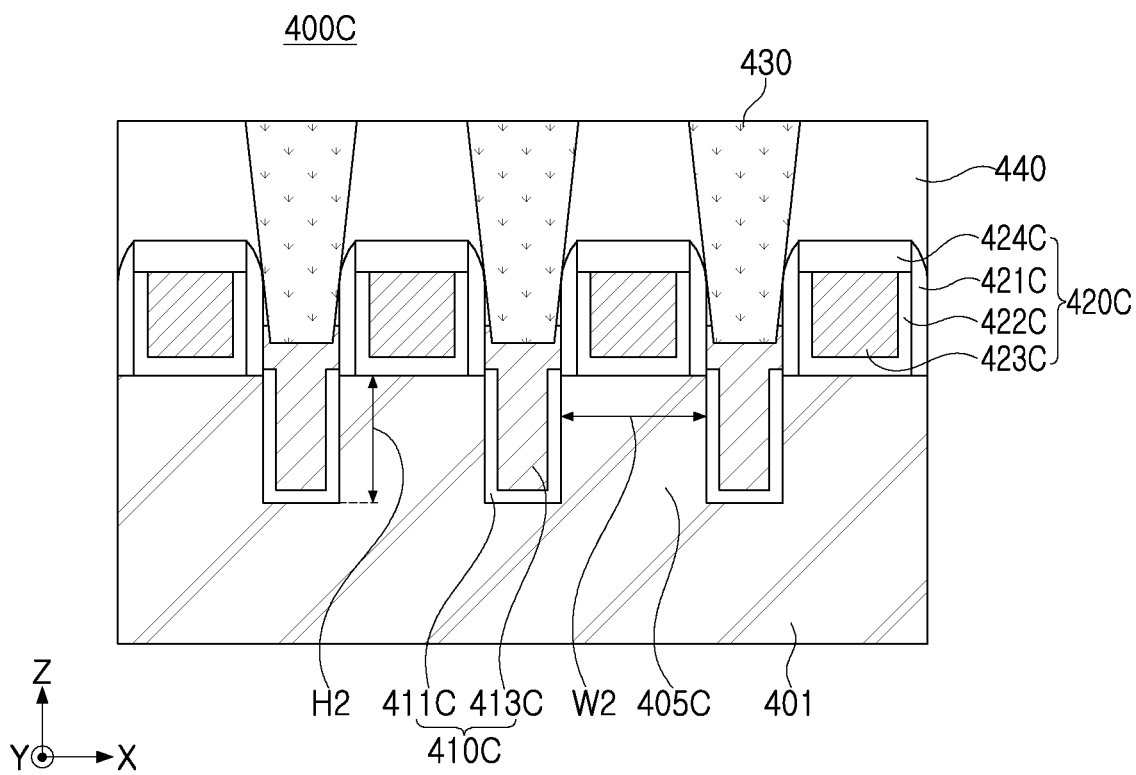

In the example embodiment illustrated in FIG. 5, both the height and width of the plurality of fin structures 405C included in the semiconductor device 400C may increase. Referring to FIG. 5, the plurality of fin structures 405C may have a second height H2 greater than the first height H1 and a second width W2 greater than the first width W1.

For example, the spectral distribution obtained for measuring the heights of the plurality of fin structures 405 in the semiconductor device 400 according to the example embodiment illustrated in FIG. 2 may be different from the spectral distributions obtained for measuring the heights of the plurality of fin structures 405A-405C in the semiconductor devices 400A-400C according to the example embodiment illustrated in FIGS. 3 to 5.

However, as the structures included in the semiconductor devices 400 (400A-400C) have been increasingly miniaturized, it may be difficult to identify whether a difference between the spectral distributions obtained from the semiconductor devices 400A-400C according to the example embodiments illustrated in FIGS. 3 to 5 is caused by a change in height or a change in width. For example, the plurality of fin structures 405A-405C may be formed by etching a portion of a region of the substrate 401. When the height of the plurality of fin structures 405A-405C is to be increased, the height and also the width of the plurality of fin structures 405A-405C may be increased by the etching process. In this case, it may be difficult to identify whether the change in the spectral distribution output by the semiconductor measurement apparatus is more affected by a change in height or a change in width of the plurality of fin structures 405A-405C, and accordingly, it may be impossible to determine the desired critical dimension.

Different critical dimensions, such as a height and width, may have different sensitivities with respect to the measurement conditions of the semiconductor measurement apparatus. For example, a predetermined azimuth and incidence angle conditions may have a higher sensitivity for height than width. In consideration of these characteristics, a desired critical dimension may be more accurately measured by obtaining spectral distributions from the semiconductor devices 400A-400C under various azimuth and incidence angle conditions. However, generally, since the adjustable azimuth and incidence angle in the semiconductor measurement apparatus are limited, the above-described method may have a limitation.

As described above with reference to FIG. 1, the semiconductor measurement apparatus according to an example embodiment may determine the critical dimension of the structure included in the sample by irradiating light having an optical axis perpendicular to the surface of the sample and receiving the reflected light. Accordingly, data corresponding to the entire azimuth corresponding to 0 degrees to 360 degrees may be obtained by imaging once, and data corresponding to a wide range of incidence angle according to the numerical aperture of the objective lens may be obtained by imaging once. Accordingly, data corresponding to the azimuth and incidence angles at which sensitivity to the critical dimension to be measured is the highest may be selected from various azimuths and incidence angles, and the critical dimension may be determined based on the spectral distribution. Accordingly, by accurately determining only the critical dimension to be measured irrespective of the interaction between the critical dimensions affecting each other in the structures having minute dimensions, the efficiency of a process using the semiconductor measurement apparatus may improve.

For example, in an example embodiment, data obtained by imaging once may be orthogonally decomposed into a plurality of bases, and a critical dimension may be determined using a weight having the highest sensitivity among a plurality of weights allocated to the plurality of bases. Alternatively, the critical dimension may be determined using distribution of a plurality of weights according to the plurality of bases. Accordingly, in spite of obtaining data of a wide azimuth and incidence angle by imaging once, by reducing the size of data to be processed and stored, a measurement process may be efficiently performed.

Different critical dimensions, such as height and width, may have different sensitivities with respect to various parameters exhibiting characteristics of the polarization components of light reflected by the sample. For example, a specific critical dimension may have high sensitivity to a degree of polarization (DOP) rather than a difference in intensity or a phase difference between polarization components. In an example embodiment, a desired critical dimension may be accurately measured using elements of a Mueller matrix by which sensitivity may be determined, in addition to a difference in intensity or a phase difference between polarization components.

Figure 6:
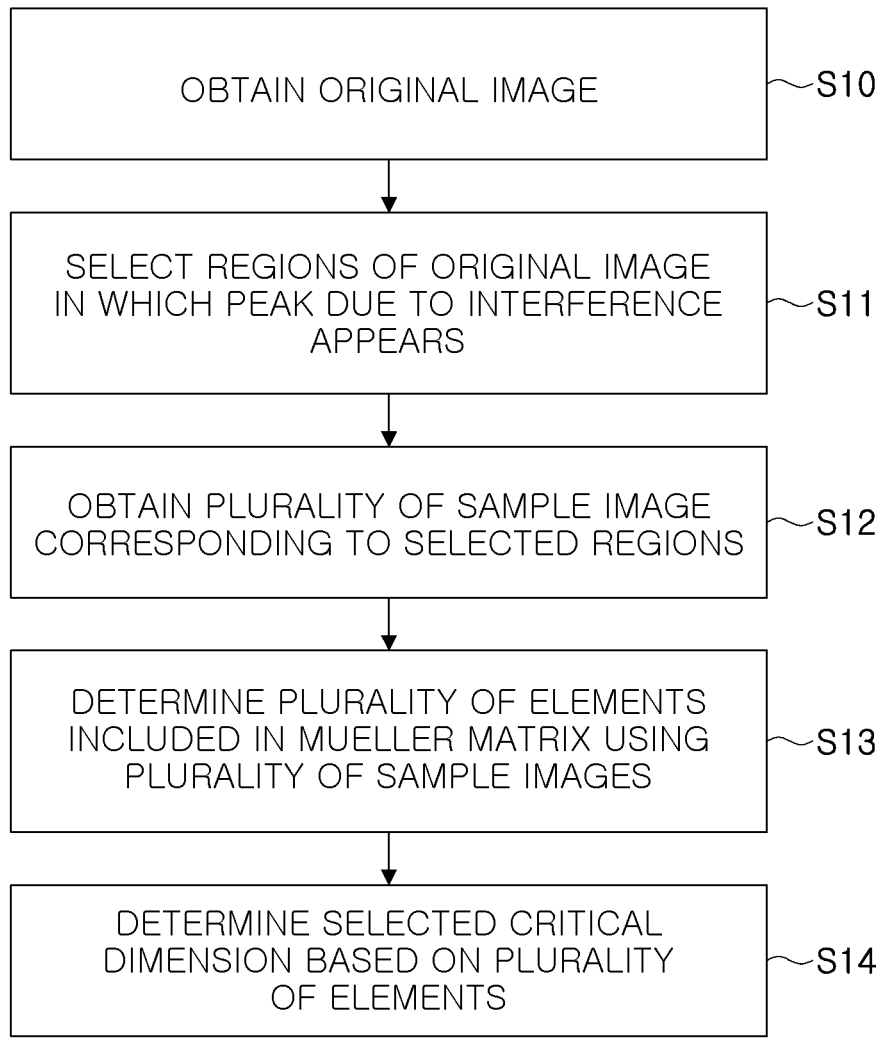
FIGS. 6 and 7 are diagrams illustrating a measurement method using a semiconductor measurement apparatus according to an example embodiment of the present disclosure.
Figure 7:
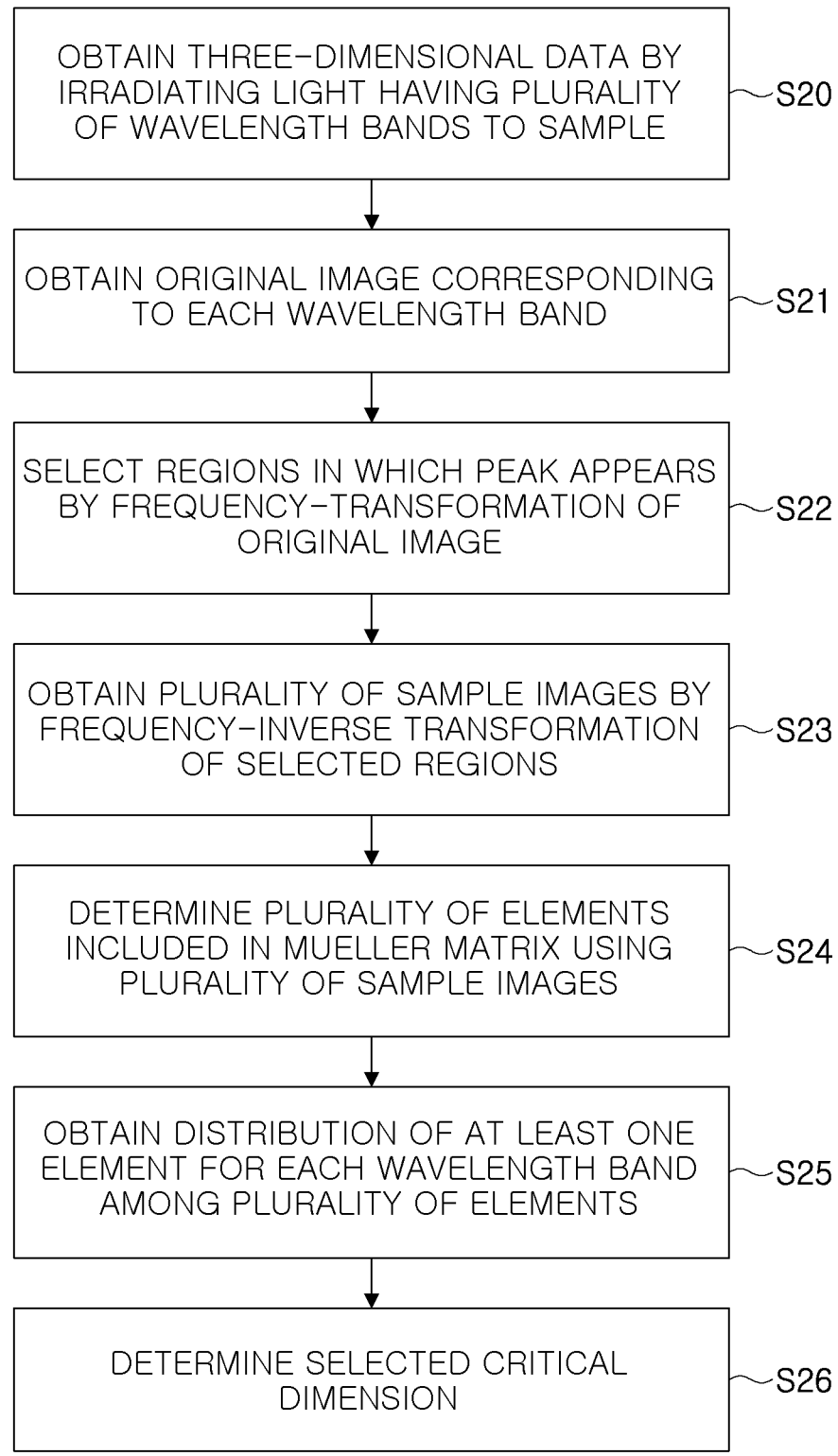

FIGS. 6 and 7 are diagrams illustrating a measurement method using a semiconductor measurement apparatus according to an example embodiment.

Referring to FIG. 6, operation of the semiconductor measurement apparatus according to an example embodiment may start by obtaining an original image (S10). The original image obtained by the control unit of the semiconductor measurement apparatus in operation S10 may be an image generated by the image sensor receiving light irradiated by the illumination unit of the semiconductor measurement apparatus in the sample, reflected by the sample, and passing through the optical unit.

For example, each of the illumination unit and the optical unit of the semiconductor measurement apparatus may include at least one polarization element. Accordingly, the original image generated by the image sensor may be a multi-interference image generated by polarization components of light generated by a polarization element included in each of the illumination unit and the optical unit.

The control unit of the semiconductor measurement apparatus may select regions of the original image in which a peak due to interference appears (S11). As described above, the original image may represent an interference pattern of polarization components of light generated by a plurality of polarization elements included in the semiconductor measurement apparatus. Accordingly, the control unit may image-process the original image and may select a region in which a peak appears as at least a portion of the polarization components interfere with each other.

The control unit may obtain a plurality of sample images corresponding the regions which may be selected as it is determined that a peak appears in the regions (S12), and may determine a plurality of elements included in a Mueller matrix using the plurality of sample images (S13). The Mueller matrix may be for handling a Stokes vector representing the polarization components of light, and the Mueller matrix may represent light incident to the image sensor by 16 elements. For example, the Mueller matrix may be a 4×4 matrix, and the total intensity of light incident to each pixel of the image sensor may be represented by the elements included in the Mueller matrix.

In an example embodiment, the control unit may select 16 regions of the original image in which a peak due to interference appears, and may generate 16 sample images corresponding to the 16 regions. Also, the control unit may determine elements of the Mueller matrix which may represent the 16 sample images.

When the plurality of elements are determined, the control unit may determine a selected critical dimension among the critical dimensions of the structure included in the sample based on the plurality of elements (S13). For example, the plurality of elements may be generated as data in an image format, and the control unit may determine the selected critical dimension by comparing the reference image data stored in the library data with the plurality of elements. Alternatively, the control unit may calculate a predetermined measurement parameter, that is, for example, a difference in intensity between polarization components, a phase difference between polarization components, and a degree of polarization using a plurality of elements, and may compare the parameters with reference parameters stored in library data, thereby determining a selected critical dimension.

Referring to FIG. 7, operation of the semiconductor measurement apparatus according to an example embodiment may start by obtaining three-dimensional (3D) data by irradiating a sample with light having a plurality of wavelength bands (S20). The control unit of the semiconductor measurement apparatus may control the illumination unit to irradiate light having different wavelength bands to the sample, and while the light of each wavelength band is irradiated to the sample, the control unit may obtain a multi-interference image generated by interference between polarization components of light. Accordingly, since multi-interference images are generated in a plurality of wavelength bands, the control unit may obtain 3D data in which multi-interference images are arranged according to wavelength bands.

The control unit of the semiconductor measurement apparatus may obtain a multi-interference image corresponding to each wavelength band as an original image (S21), and may perform frequency-transformation of the original image and may select regions in which a peak appears (S22). For example, the control unit may transform the original image into a frequency domain by applying a Fourier transform to the original image.

When regions in which a peak appears are selected, the control unit may obtain a plurality of sample images by applying an inverse Fourier transform to the selected regions (S23). Prior to generating the plurality of sample images, digital filtering and centering operations may be performed on the selected regions in the frequency domain. By the digital filtering and centering operations, in the two-dimensional data before inverse Fourier transform, the regions in which peaks appear may be aligned to be disposed in the center.

Thereafter, the control unit may determine a plurality of elements included in the Mueller matrix using the plurality of sample images (S24). As described above, the Mueller matrix may be a matrix for handling Stokes vectors representing polarization components of light. An original image may be obtained as a multi-interference image by a plurality of polarization elements included in the illumination unit and the light receiving unit of the semiconductor measurement apparatus, and accordingly, the number of regions selected in operation S22 and the number of sample images generated in operation S23 may be equal to or greater than the number of elements included in the Mueller matrix. Accordingly, the control unit may generate a Mueller matrix for representing each of the plurality of sample images obtained in operation S23.

The control unit may obtain distribution of at least one element for each wavelength band among the plurality of elements (S25). As described above, a plurality of multi-interference images corresponding to wavelength bands, respectively, may be generated while changing the wavelength band of light irradiated to the sample by the illumination unit. Accordingly, a plurality of elements included in the Mueller matrix may also be generated as 3D data corresponding to a plurality of wavelength bands.

The control unit may select at least one element among the plurality of elements, and may obtain distribution of the at least one element for each wavelength band. Since each of the plurality of elements is generated as data of an image format represented on a two-dimensional plane, the control unit may select a specific pixel on the two-dimensional plane and may obtain distribution of values of the selected pixel for each wavelength band.

The control unit may determine the selected critical dimension using the distribution of at least one element for each wavelength band (S26). For example, there may be an element having high sensitivity to the selected critical dimension among critical dimensions representing a structure included in the sample, and a wavelength band having particularly high sensitivity to the selected critical dimension in the element. The control unit may select at least one element having high sensitivity among the plurality of elements according to a selected critical dimension to be measured, and may refer to an element or values of at least a portion of pixels among the pixels included in the element in the wavelength band having high sensitivity by referring to the distribution of the selected element for each wavelength band, thereby determining the selected critical dimension.

As described with reference to FIGS. 6 and 7, the semiconductor measurement apparatus according to an example embodiment may use a difference in intensity between polarization components and a phase difference between polarization components of light and also the other generated measurement parameters in the determination of the selected critical dimension. Accordingly, despite the interaction in which the critical dimensions of the structures included in the sample influence each other, measurement parameters with high sensitivity to the selected critical dimensions to be measured may be used, thereby improving the accuracy of measuring the structures formed in the sample. Also, since data corresponding to the entire azimuth and a wide range of incidence angle may be obtained by imaging once using an objective lens having a high numerical aperture, the efficiency of the measurement process may improve.

Figure 8:
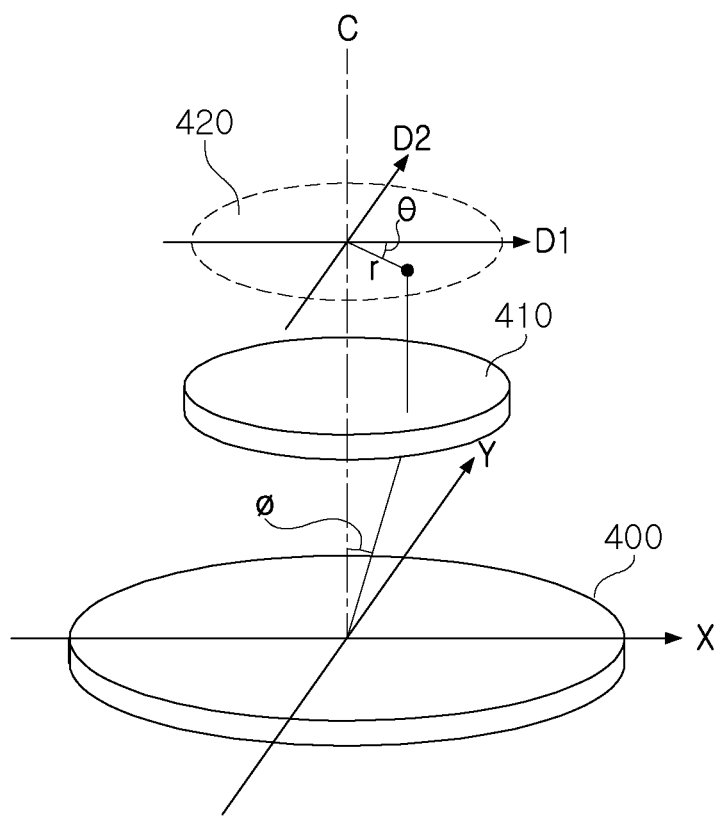
FIG. 8 is a diagram illustrating a method of operating a semiconductor measurement apparatus according to an example embodiment of the present disclosure.

FIG. 8 is a diagram illustrating a method of operating a semiconductor measurement apparatus according to an example embodiment.

Referring to FIG. 8, light may be irradiated to the surface of the sample 400, and the surface of the sample 400 may be defined as an XY plane. The optical axis C may extend from the origin of the XY plane and may extend in a direction perpendicular to the XY plane, and the center of the objective lens 410 adjacent to the sample 400 may correspond to the optical axis C. The objective lens 410 may include a front surface facing or opposing the sample 400 and a rear surface disposed opposite to the sample 400, and a back focal plane may be defined at a predetermined distance from the rear surface of the objective lens 410.

The back focal plane 420 may be defined by the first direction D1 and the second direction D2, and for example, the first direction D1 may be the same as the X-direction of the surface of the sample 400 and the second direction D2 may be the same as the Y-direction. Light passing through the objective lens 410 may be focused on the target region of the sample 400 in the form of a spot, may be reflected by the target region, may pass through the objective lens 410 and may travel to the back focal plane 420. As described above, in the semiconductor measurement apparatus according to an example embodiment, light may be incident to the sample 400 at the entirety of azimuths including 0 degrees to 360 degrees, and the range of the incidence angle (φ) of light incident to the sample 400 may be determined according to the numerical aperture of the objective lens 410.

In an example embodiment, the objective lens 410 having a numerical aperture of 0.95 or more and less than 1.0 may be provided in the semiconductor measurement apparatus to obtain data for a wide range of incidence angles by imaging once performed by the image sensor. In this case, the maximum incidence angle of light passing through the objective lens 410 may be 72 degrees or more and less than 90 degrees. For example, the image sensor may be arranged such that the light receiving surface may be disposed in a conjugate position with respect to the position of the back focal plane of the objective lens.

When each coordinate included in the focal plane 420 defined by the first direction D1 and the second direction D2 is represented as polar coordinates (r, θ), as illustrated in FIG. 8, the first coordinate r may be determined by the incidence angle φ. Meanwhile, since the second coordinate θ is a value indicating how much the coordinate is rotated with respect to the first direction D1, the second coordinate θ may be the same as the azimuth of light incident to the sample 400, and may have a value of 0 degrees to 360 degrees.

Accordingly, in the semiconductor measurement apparatus according to an example embodiment, data including an interference pattern in the azimuth of 0 degrees to 360 degrees and the incidence angle range determined according to the numerical aperture of the objective lens 410 may be obtained in the form of an image by imaging once while light is reflected by the target region of the sample 400. Accordingly, differently from the general method which may require multiple imaging while adjusting the position and angle of the illumination unit irradiating light to the sample 400 or the sample itself, data required for analyzing and measuring the target region of the sample 400 may be obtained by imaging once, and the efficiency of a measurement process using a semiconductor measurement apparatus may improve.

FIGS. 9 to 14 are diagrams illustrating a polarization element included in a semiconductor measurement apparatus according to an example embodiment.

FIGS. 9 to 14 may be diagrams illustrating a process in which polarization components of light are separated by a polarization element included in a semiconductor measurement apparatus. In the example embodiment described with reference to FIGS. 9 to 14, the XY plane 500 may be perpendicular to the optical axis of light emitted from the illumination unit of the semiconductor measurement apparatus. As described above with reference to FIG. 1, the illumination unit may include a first illumination polarization element, a wave plate, and a second illumination polarization element disposed in order.

Figure 9:
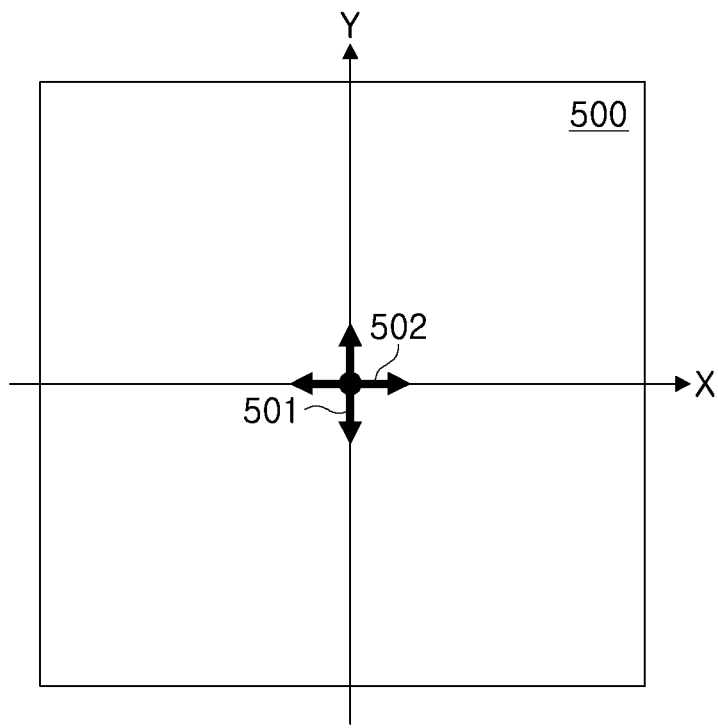
FIGS. 9 to 14 are diagrams illustrating a polarization element included in a semiconductor measurement apparatus according to an example embodiment of the present disclosure.

First, referring to FIG. 9, the optical axis of light emitted from the illumination unit may be disposed at an origin of the XY plane 500. Light incident to the XY plane 500 may include a first polarization component 501 and a second polarization component 502, and characteristics of light may be determined by intensity and a phase of each of the first polarization component 501 and the second polarization component 502.

Each of the first illumination polarization element and the second illumination polarization element included in the illumination unit may include a pair of beam displacers. For example, one of the pair of beam displacers may separate and move only the first polarization component 501, and the other may separate and move only the second polarization component 502.

Figure 10:
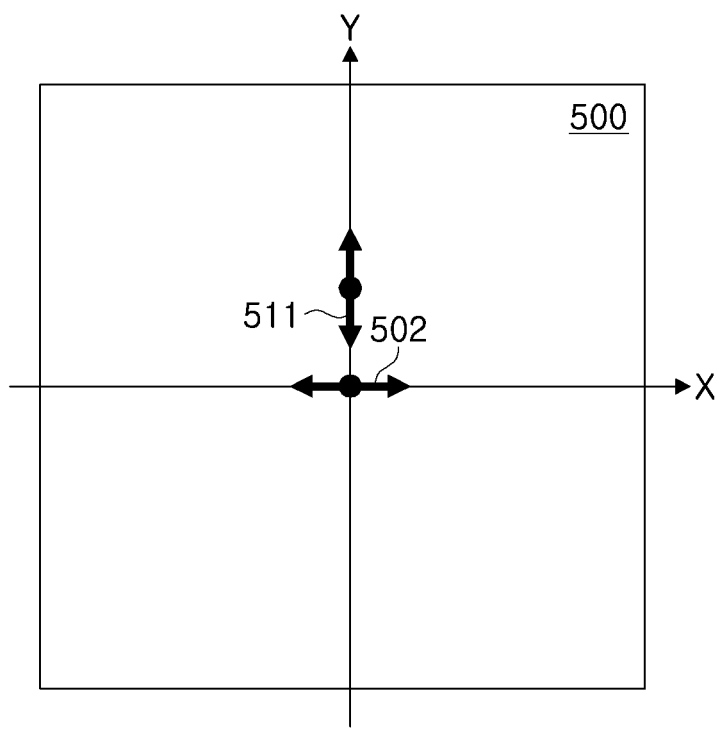

FIG. 10 may be a diagram illustrating polarization components of light passing through a first beam displacer among the pair of beam displacers included in the first illumination polarization element. Referring to FIGS. 9 and 10, the first beam displacer of the first illumination polarization element may separate and move only the first polarization component 501. Accordingly, as illustrated in FIG. 10, the first polarization component 511 of light passing through the first beam displacer of the first illumination polarization element may be disposed at the first coordinates C1, not disposed at the origin of the XY plane 500.

Figure 11:
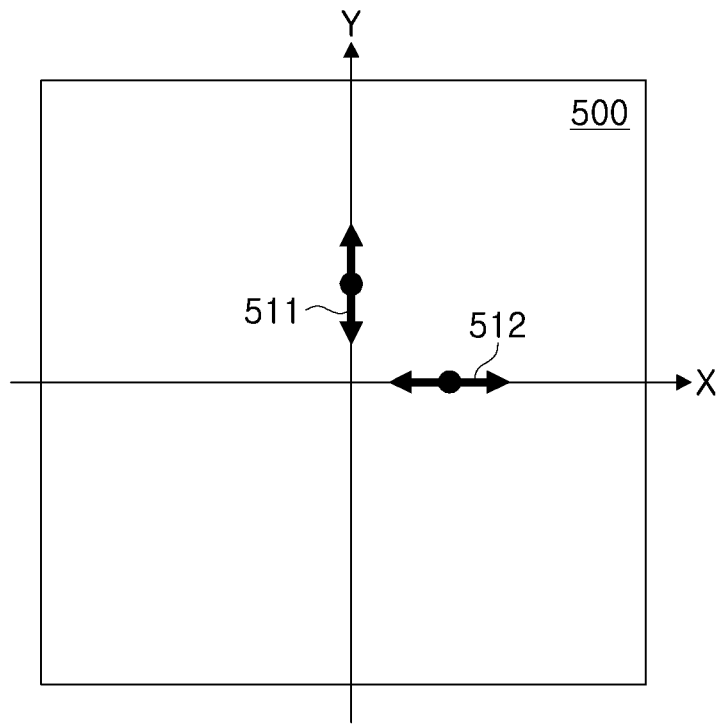

FIG. 11 may be a diagram illustrating polarization components of light passing through a second beam displacer among a pair of beam displacers included in the first illumination polarization element. The second beam displacer of the first illumination polarization element may separate and move only the second polarization component 502 from the light emitted by the illumination unit. Accordingly, as illustrated in FIG. 11, the second polarization component 512 of light passing through the second beam displacer of the first illumination polarization element may be disposed at the second coordinate C2, not disposed at the origin of the XY plane 500.

Figure 12:
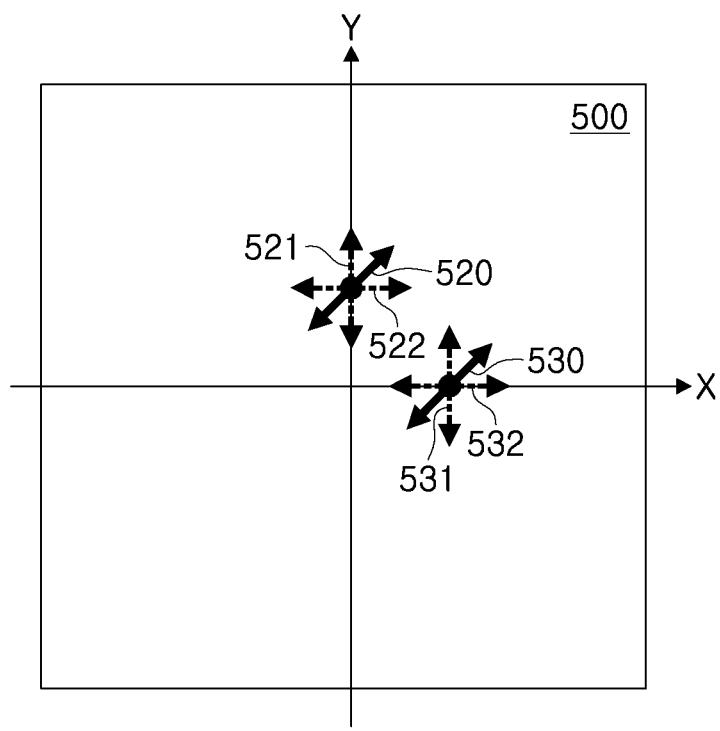

FIG. 12 may be a diagram illustrating light after passing through the wave plate included in the illumination unit. Referring to FIG. 12, the polarization direction of light may be adjusted by the wave plate. For example, the polarization direction of each of the first polarization component 511 and the second polarization component 512 separated by the first illumination polarization element may be shifted by 45 degrees, such that first light 520 having an optical axis passing through the first coordinate C1 and second light 530 having an optical axis passing through the second coordinate C2 may be generated.

Light incident to the XY plane 500 may be decomposed into polarization components traveling in each of directions orthogonal to each other, that is, may be decomposed into a polarization component traveling in the X-axis direction and a polarization component traveling in the Y-axis direction. Referring to FIG. 12, light of the first path 520 may be decomposed into a first polarization component 521 traveling in the Y-axis direction and a second polarization component 522 traveling in the X-axis direction. Similarly, light of the second path 530 may also be decomposed into a first polarization component 531 and a second polarization component 532.

Figure 13:
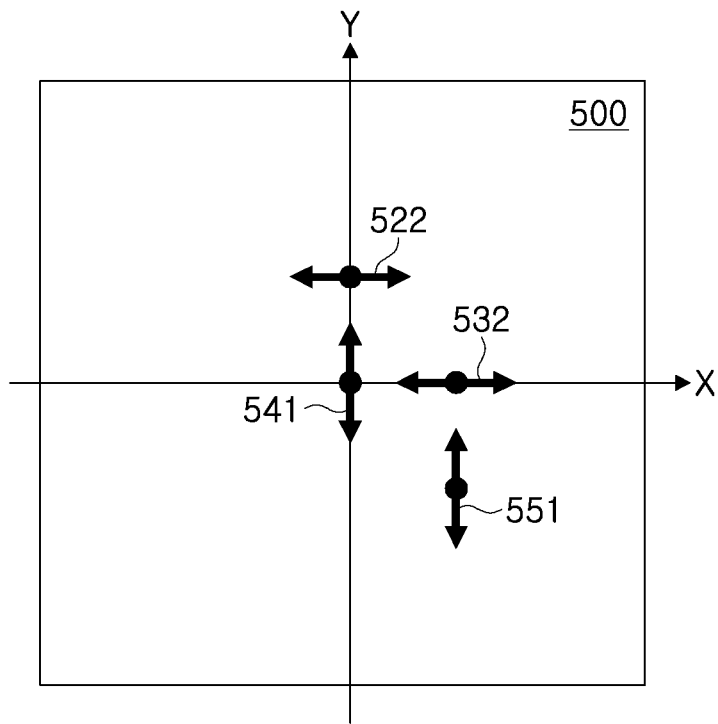

Light passing through the wave plate may be incident to the second polarization component. FIG. 13 may be a diagram illustrating polarization components of light passing through a first beam displacer among a pair of beam displacers included in the second polarization component. Referring to FIG. 13, the first beam displacer of the second polarization component may selectively separate and move only the first polarization components 521 and 531 from each of the first light 520 and the second light 530. Accordingly, as illustrated in FIG. 13, a first polarization component 541 passing through the third coordinate C3, which is the origin, and a first polarization component 551 passing through the fourth coordinate C4 may be generated. The positions of the second polarization components 522 and 532 of the first light 520 and the second light 530 may not be adjusted.

Figure 14:
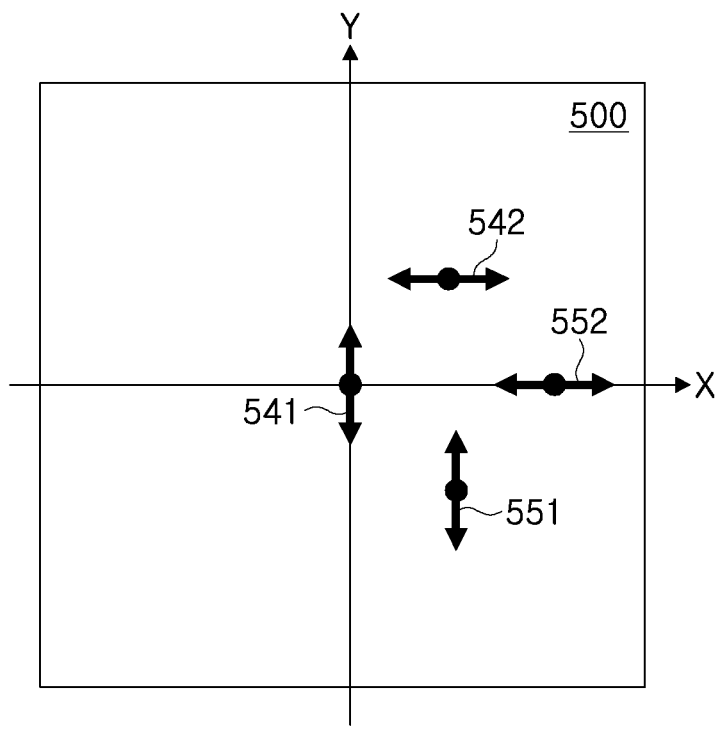

FIG. 14 may be a diagram illustrating polarization components of light passing through a second beam displacer among a pair of beam displacers included in the second polarization component. Differently from the first beam displacer, the second beam displacer may only adjust the position of the second polarization component 522 and 532. For example, as illustrated in FIG. 14, the position of the first polarization component 542 of the first light 520 may be changed to the fifth coordinate C5, and the position of the second polarization component 552 of the second light 530 may be changed to the sixth coordinate C6. Accordingly, as illustrated in FIG. 14, light emitted by the light source in the illumination unit may be separated into the polarization components 541, 542, 551, and 552 corresponding to four paths and may be incident to the sample.

As described above with reference to FIG. 1, the optical unit disposed between the sample and the image sensor also may include polarization elements, and each of the polarization elements of the optical unit may include a pair of beam displacers. Accordingly, each of the polarization components 541, 542, 551, and 552 reflected by the sample may be decomposed into a plurality of polarization components by the polarization elements of the optical unit, and may be incident to the image sensor. For example, when the optical unit includes two polarization elements, each of the polarization components 541, 542, 551, and 552 reflected by the sample may be decomposed into four polarization components, and the image sensor may generate a multi-interference image in which 16 polarization components interfere with each other.

Figure 15:
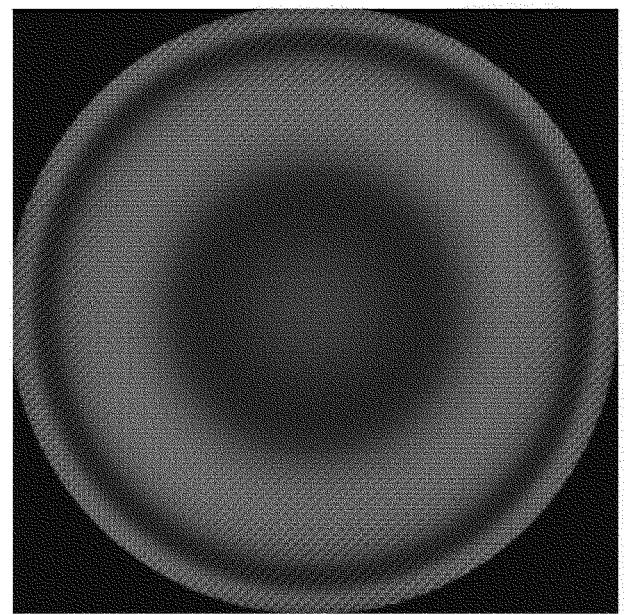
FIG. 15 is a diagram illustrating an original image obtained by a semiconductor measurement apparatus according to an example embodiment of the present disclosure.
Figure 16:
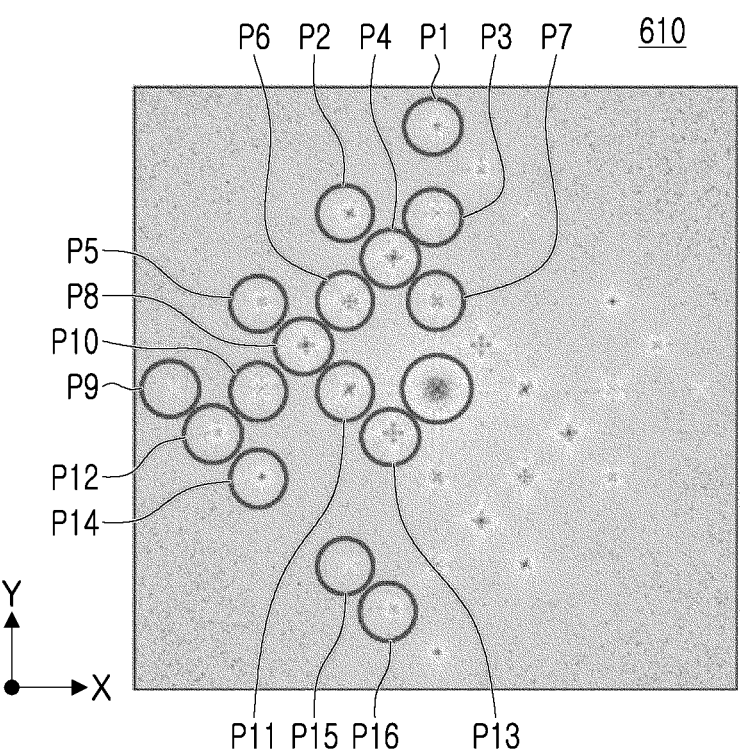
FIG. 16 is a diagram illustrating a frequency-transform image obtained by a semiconductor measurement apparatus from an original image according to an example embodiment of the present disclosure.

FIG. 15 is a diagram illustrating an original image obtained by a semiconductor measurement apparatus according to an example embodiment. FIG. 16 is a diagram illustrating a frequency-transform image obtained by a semiconductor measurement apparatus from an original image according to an example embodiment.

FIG. 15 is a diagram illustrating an example of an original image 600 generated by an image sensor included in the semiconductor measurement apparatus, and as described above, the original image 600 generated by the image sensor may be a multi-interference image. Each of the illumination unit irradiating light to the sample and the optical unit transmitting light reflected by the sample to the image sensor may include polarization elements, and at least a portion of the polarization elements may be implemented as a beam displacer.

Accordingly, as described above with reference to FIGS. 9 to 14, light passing through the illumination unit and the optical unit may be decomposed into a plurality of polarization components traveling in different positions on a plane parallel to the light receiving surface of the image sensor. A plurality of polarization components incident to the image sensor may interfere with each other, and the image sensor may generate a multi-interference image representing an interference pattern of the plurality of polarization components as illustrated in FIG. 15.

The original image 600 according to the example embodiment illustrated in FIG. 15 may be an image obtained by an image sensor included in the semiconductor measurement apparatus by imaging once. The original image 600 may be represented on a plane corresponding to the back focal plane of the objective lens disposed adjacent to the sample, and as described above with reference to FIG. 8, the coordinates of each of the pixels included in the original image 600 may be determined by an azimuth and an incidence angle of light.

The original image 600 generated by the image sensor may be transmitted to the control unit of the semiconductor measurement apparatus, and the control unit may obtain a plurality of sample images by processing the original image 600. The control unit may generate a Mueller matrix from the plurality of sample images obtained from the original image 600, and may determine a selected critical dimension among the critical dimensions of the structure included in a region in which light is reflected by the sample based on a plurality of elements included in the Mueller matrix.

To obtain the plurality of sample images, the control unit of the semiconductor measurement apparatus may obtain a frequency-transform image 610 by processing the original image 600. For example, the control unit may obtain the frequency-transform image 610 defined in the frequency domain by applying a Fourier transform to the original image 600.

In the frequency-transform image 610, regions in which a peak appears due to interference between polarization components of light incident to the image sensor may be displayed. For example, as illustrated in FIG. 16, the regions in which the peak appears may be symmetrically distributed by 180 degrees with respect to the origin, which is the center of the frequency-transform image 610.

The control unit may select regions in which peaks appears due to interference between polarization components to not overlap each other. For example, the control unit may select a plurality of regions from each of the plurality of positions P1-P16 defined as illustrated in FIG. 16 such that regions symmetrically distributed by 180 degrees with respect to the origin may not overlap each other. In each of the selected regions, at least two or more of the polarization components decomposed by the polarization elements included in the semiconductor measurement apparatus may interfere with each other such that a peak may appear.

As illustrated in FIG. 16, the control unit may generate a plurality of sample images by separating the selected regions from the frequency-transform image 610 and performing frequency-inverse transformation. Hereinafter, an operation of generating a plurality of sample images will be described in greater detail with reference to FIGS. 17 and 18.

Figure 17:
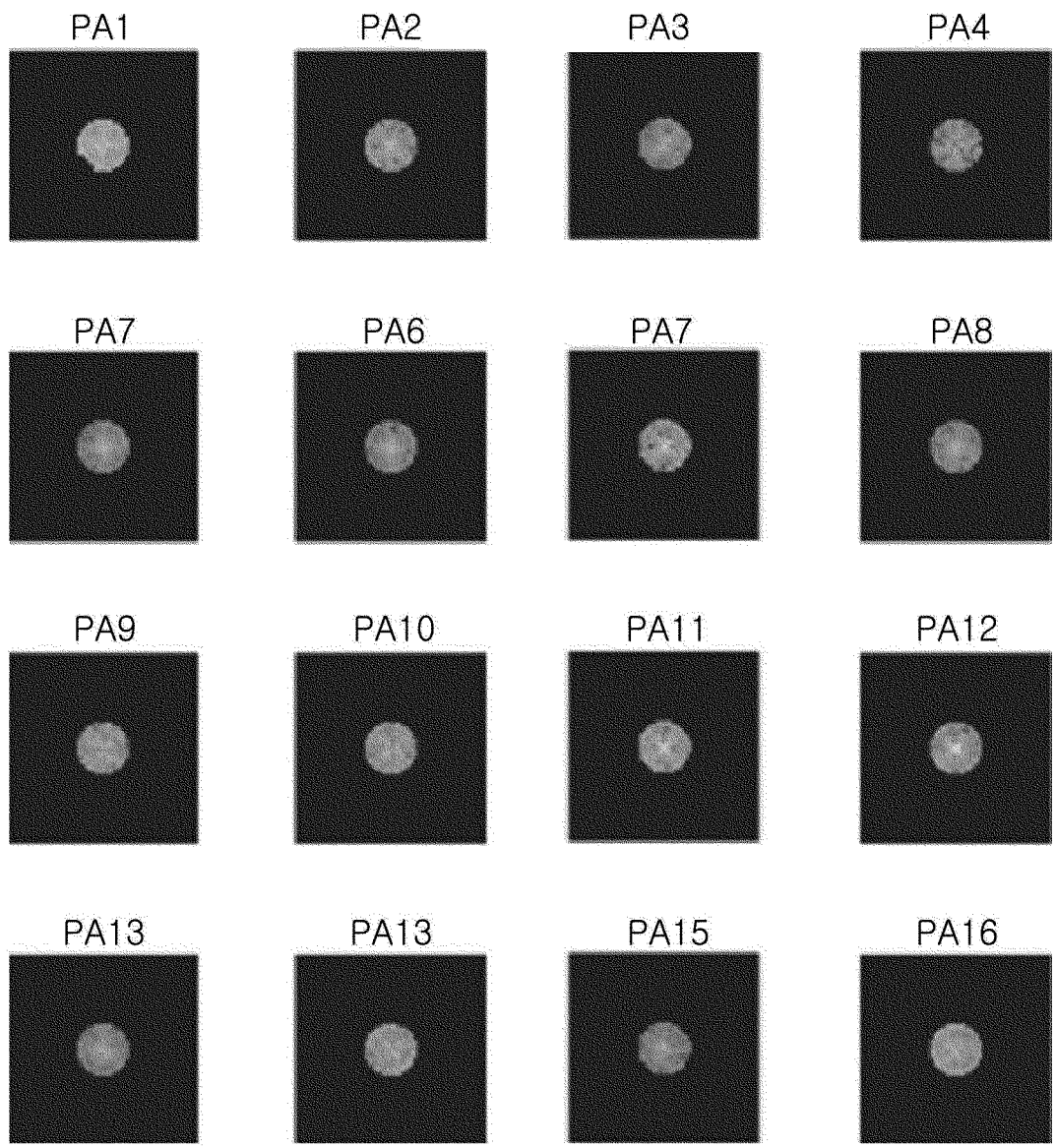
FIG. 17 is a diagram illustrating regions selected from a frequency-transform image by a semiconductor measurement apparatus according to an example embodiment of the present disclosure.
Figure 18:
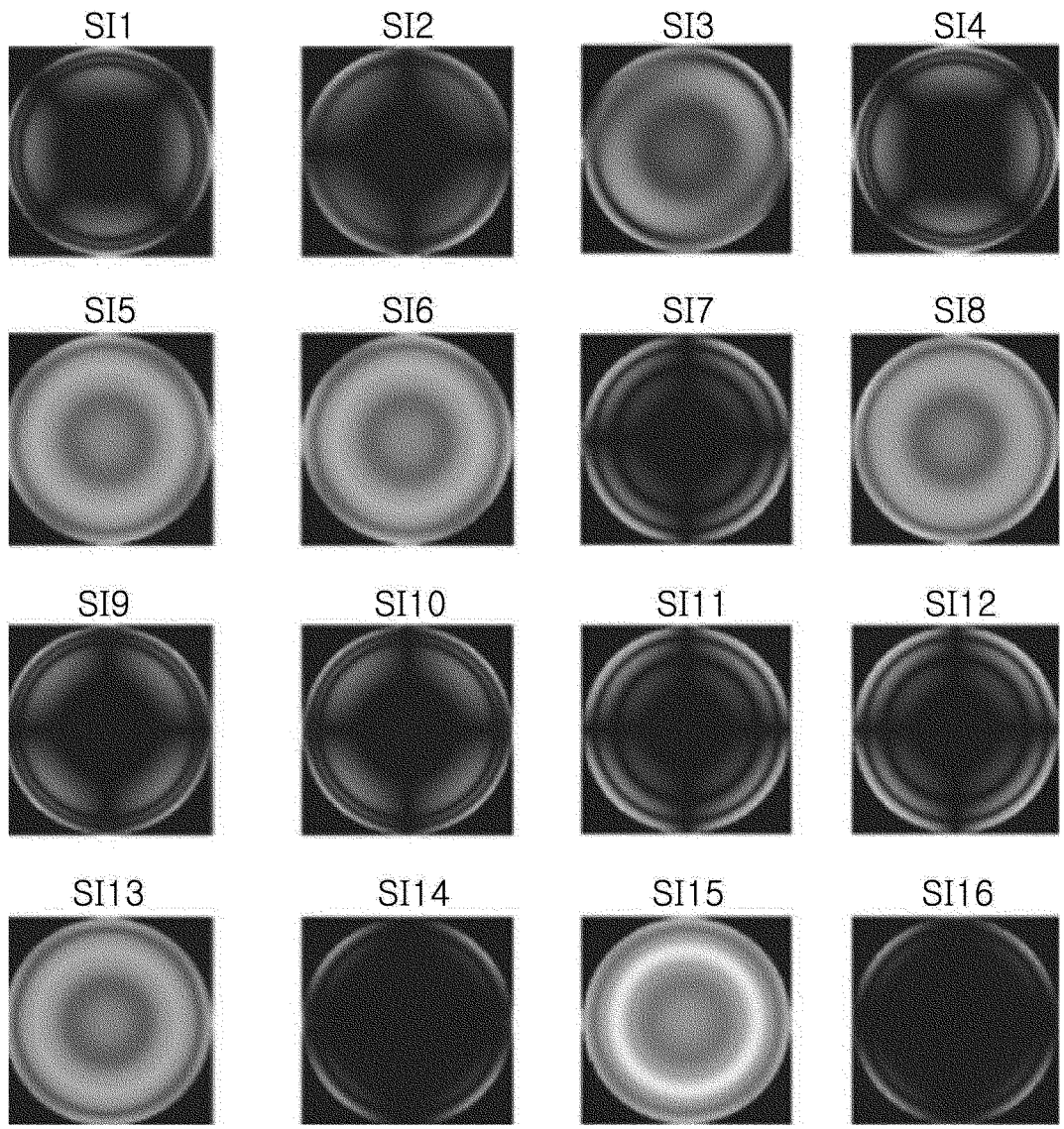
FIG. 18 is a diagram illustrating a plurality of sample images obtained by a semiconductor measurement apparatus from a frequency-transform image according to an example embodiment of the present disclosure.

FIG. 17 is a diagram illustrating regions selected from a frequency-transform image by a semiconductor measurement apparatus according to an example embodiment. FIG. 18 is a diagram illustrating a plurality of sample images obtained by a semiconductor measurement apparatus from a frequency-transform image according to an example embodiment.

FIG. 17 may be a diagram illustrating data generated by separating regions of the frequency-transform image which are determined to have a peak by the control unit of the semiconductor measurement apparatus. As in the example embodiment described above with reference to FIG. 16, the control unit may select regions of the frequency-transform image 610 in which a peak appears due to interference between polarization components from a plurality of positions P1 to P16.

The control unit may obtain a plurality of pieces of data PA1-PA16 as illustrated in FIG. 17 by filtering the selected regions from the frequency-transform image 610 and an operation such as a centering operation of disposing the position in which the peak is detected in the center. In the example embodiment in FIG. 17, the plurality of pieces of data PA1-PA16 may correspond to a plurality of positions P1-P16 included in the frequency-transform image 610. The control unit may obtain the plurality of sample images SI1-SI16 as illustrated in FIG. 18 by performing frequency-inverse transformation of each of the plurality of pieces of data PA1-PA16.

Each of the plurality of sample images SI1-SI16 may represent an interference pattern of polarization components. In other words, each of the plurality of sample images SI1-SI16 may represent the state of at least a portion of the polarization components decomposed by a polarization element included in the illumination unit and the optical unit, interfering with each other, and incident to the image sensor.

As such, in an example embodiment, in addition to a difference in intensity and a phase difference between the P-polarization component and the S-polarization component included in light, a plurality of sample images SI1 to SI16 indicating the state of at least a portion of the polarization component decomposed to travel in a plurality of different positions by the polarization element may be obtained.

Accordingly, differently from the method using only a difference in intensity and a phase difference between the P-polarization component and the S-polarization component, the critical dimension of the structure may be determined using the state of the polarization components travelling separately from each other in various positions and incident to the image sensor. Accordingly, the number of measurement parameters available for measurement of a critical dimension may increase, and accuracy of measurement of a critical dimension may improve.

To increase the number of measurement parameters available for measuring a critical dimension, a Mueller matrix may be used in an example embodiment. For example, a plurality of elements included in the Mueller matrix may be determined using the plurality of sample images SI1-SI16, and a critical dimension to be measured may be determined by comparing at least a portion of the plurality of elements with reference data stored in library data, which will be described in greater detail with reference to FIGS. 19 and 20.

Figure 19:
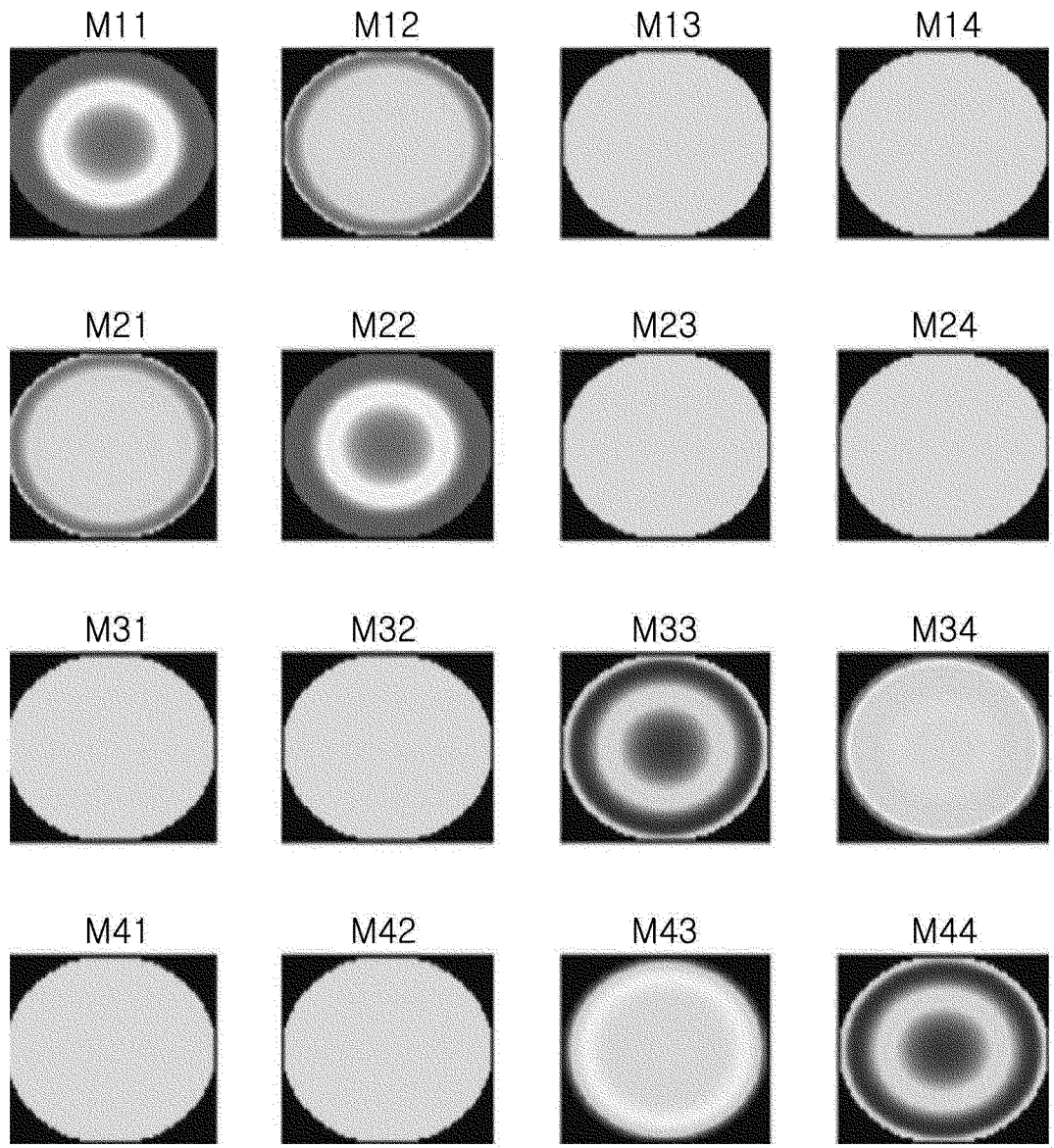
FIGS. 19 and 20 are diagrams illustrating elements of a Mueller matrix obtained by a semiconductor measurement apparatus according to an example embodiment of the present disclosure.
Figure 20:
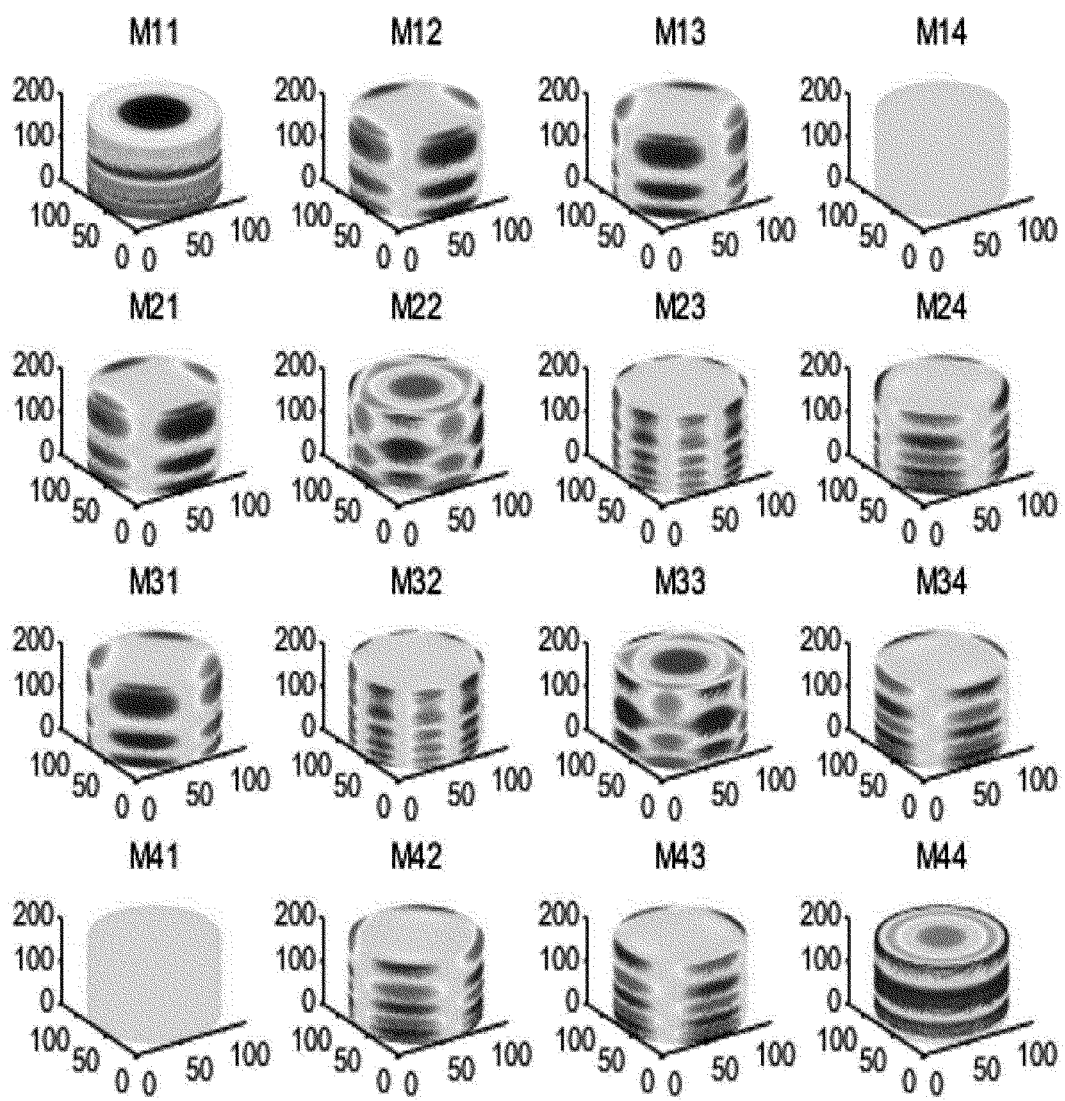

FIGS. 19 and 20 are diagrams illustrating elements of a Mueller matrix obtained by a semiconductor measurement apparatus according to an example embodiment.

As described above, the Mueller matrix may be a matrix for handling Stokes vectors representing polarization components of light, and the Mueller matrix may include 16 elements M11-M44. When 16 sample images SI1-SI16 are obtained from a single original image 600 as in the example embodiment described with reference to FIGS. 15 to 18, the elements M11 to M44 included in the Mueller matrix may be determined using the sample images SI1-SI16.

For example, each of the plurality of sample images SI1-SI16 representing interference between at least a portion of the polarization components of light reflected by the sample may be defined as a polynomial including at least one of the elements included in the Mueller matrix. Accordingly, inversely, the elements M11-M44 of the Mueller matrix may be determined using the plurality of sample images SI1-SI16. For example, a correspondence relationship between the plurality of sample images SI1-SI16 and the elements M11-M44 of the Mueller matrix may be as in Table 1 below.

TABLE 1

| Position | X Coordinate | Y Coordinate | Real number part | Imaginary number part |
|---|---|---|---|---|
| 1 | 0 | 6y | $\frac{1}{32}(M_{33} - M_{44})$ | $-\frac{1}{32}(M_{34} - M_{43})$ |
| 2 | 2x | 4y | $\frac{1}{32}(2M_{23} - M_{33} + M_{44})$ | $\frac{1}{32}(-2M_{24} + M_{34} + M_{43})$ |
| 3 | 0 | 4y | $\frac{1}{8}M_{31}$ | $-\frac{1}{8}M_{41}$ |
| 4 | x | 3y | $\frac{1}{16}(2M_{22} + M_{32})$ | $-\frac{1}{16}M_{42}$ |
| 5 | 4x | 2y | $-\frac{1}{32}(2M_{23} + M_{33} + M_{44})$ | $\frac{1}{32}(2M_{24} + M_{34} + M_{43})$ |
| 6 | 2x | 2y | $\frac{1}{4}M_{21}$ | 0 |
| 7 | 0 | 2y | $\frac{1}{32}(4M_{13} - 2M_{23} + M_{33} + M_{44})$ | $-\frac{1}{32}(4M_{14} + 2M_{24} - M_{34} + M_{43})$ |

TABLE 1-continued

| Position | X Coordinate | Y Coordinate | Real number part | Imaginary number part |
|---|---|---|---|---|
| 8 | 3x | y | $\frac{1}{16}(2M_{22} - M_{32})$ | $-\frac{1}{16}M_{42}$ |
| 9 | 6x | 0 | $\frac{1}{32}(M_{33} + M_{44})$ | $-\frac{1}{32}(M_{34} - M_{43})$ |
| 10 | 4x | 0 | $-\frac{1}{8}M_{31}$ | $-\frac{1}{8}M_{41}$ |
| 11 | 2x | 0 | $\frac{1}{32}(4M_{13} - 2M_{23} - M_{33} + M_{44})$ | $\frac{1}{32}(4M_{14} + 2M_{24} + M_{34} + M_{43})$ |
| 12 | 5x | −y | $-\frac{1}{16}M_{32}$ | $-\frac{1}{16}M_{42}$ |
| 13 | X | −y | $\frac{1}{4}M_{12}$ | 0 |
| 14 | 4x | −2y | $-\frac{1}{32}(M_{33} - M_{44})$ | $-\frac{1}{32}(M_{34} + M_{43})$ |
| 15 | 2x | −4y | $-\frac{1}{32}(M_{33} + M_{44})$ | $\frac{1}{32}(M_{34} - M_{43})$ |
| 16 | X | −5y | $\frac{1}{16}M_{32}$ | $\frac{1}{16}M_{42}$ |

As indicated in Table 1 above, a plurality of elements M11-M44 included in the Mueller matrix may be calculated using the plurality of sample images SI1-SI16. The Mueller matrix may be a matrix for handling the Stokes vector, and using the Stokes vector, other measurement parameters such as a degree of polarization in addition to an intensity difference and phase difference between polarization components may be obtained. Accordingly, various measurement parameters representing characteristics of polarization components may be calculated using the plurality of elements M11-M44, and a selected critical dimension may be accurately determined using the parameters.

Alternatively, the control unit of the semiconductor measurement apparatus may determine the selected critical dimension by selecting at least one of the plurality of elements M11 to M44 and comparing the at least one selected element with reference data included in the library data. In this case, the control unit may compare at least one element which is data of an image format with reference data which is also data of an image format. Reference data displayed as different images according to the value of the selected critical dimension may be stored in the library data, and the control unit may determine the selected critical dimension by referring to reference data most similar to the at least one selected element.

Also, the control unit may select at least one element and may determine the selected critical dimension using spectral data representing distribution in which a pixel value of a specific coordinate in the at least one element changes depending on a wavelength band. For example, while the illumination unit of the semiconductor measurement apparatus irradiates light of a plurality of wavelength bands, the image sensor may generate an original image in each wavelength band. Accordingly, the control unit may obtain 3D data in which the original image is arranged according to the wavelength band.

The control unit may obtain a plurality of elements M11-M44 included in the Mueller matrix by processing the original image corresponding to each wavelength band. Each of the plurality of elements M11 to M44 may have a 3D data format arranged according to a wavelength band, as illustrated in FIG. 20.

In the example embodiment illustrated in FIG. 20, the control unit may select at least one element to determine a selected critical dimension, and may obtain spectral data indicating distribution of the selected element according to a wavelength band. The control unit may determine the selected critical dimension by comparing the spectral data with reference data stored in the library data, and for example, by comparing the value of the selected element in the wavelength band having the highest sensitivity for the selected critical dimension with the reference data, a critical dimension may be determined. In example embodiments, the control unit may obtain distribution of a specific pixel value according to a wavelength band in the selected element as spectral data.

FIGS. 21A to 21D are diagrams illustrating a method of operating a semiconductor measurement apparatus according to an example embodiment.

FIGS. 21A to 21D may be graphs illustrating a degree of polarization according to a position in which light is reflected by a sample. For example, in an example embodiment described with reference to FIGS. 21A to 21D, light may be irradiated to 13 different positions in a sample, and the control unit may process an original image generated by the image sensor in response to light reflected by each of the 13 positions, to thereby obtain degrees of polarization.

Figures 21A, 21B:
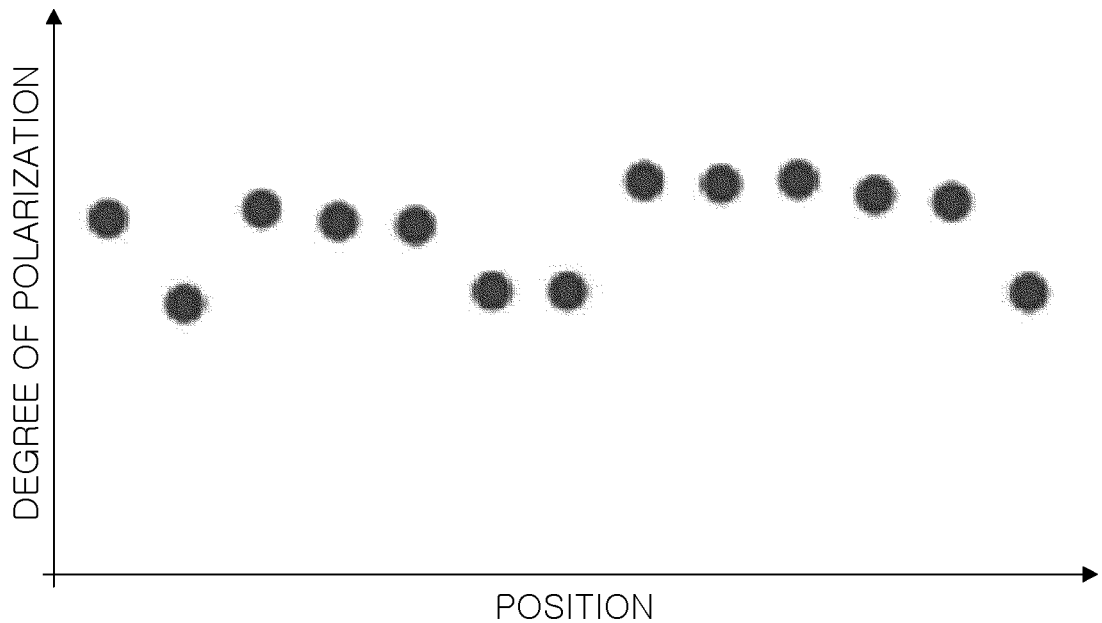
FIGS. 21A to 21D are diagrams illustrating a method of operating a semiconductor measurement apparatus according to an example embodiment of the present disclosure.
Figure 21C:
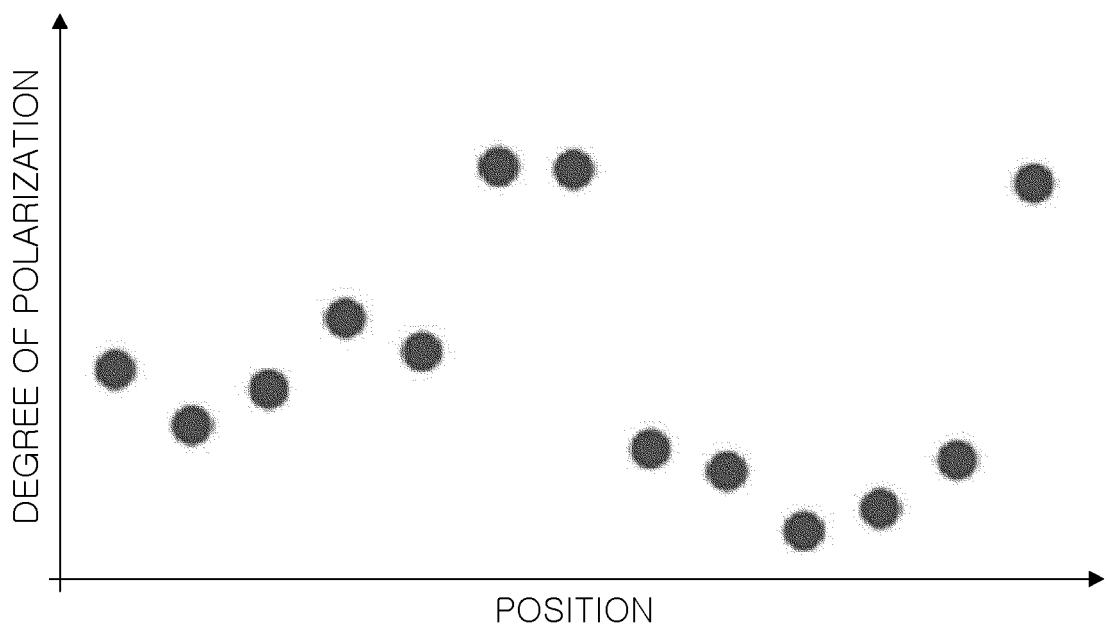
Figure 21D:
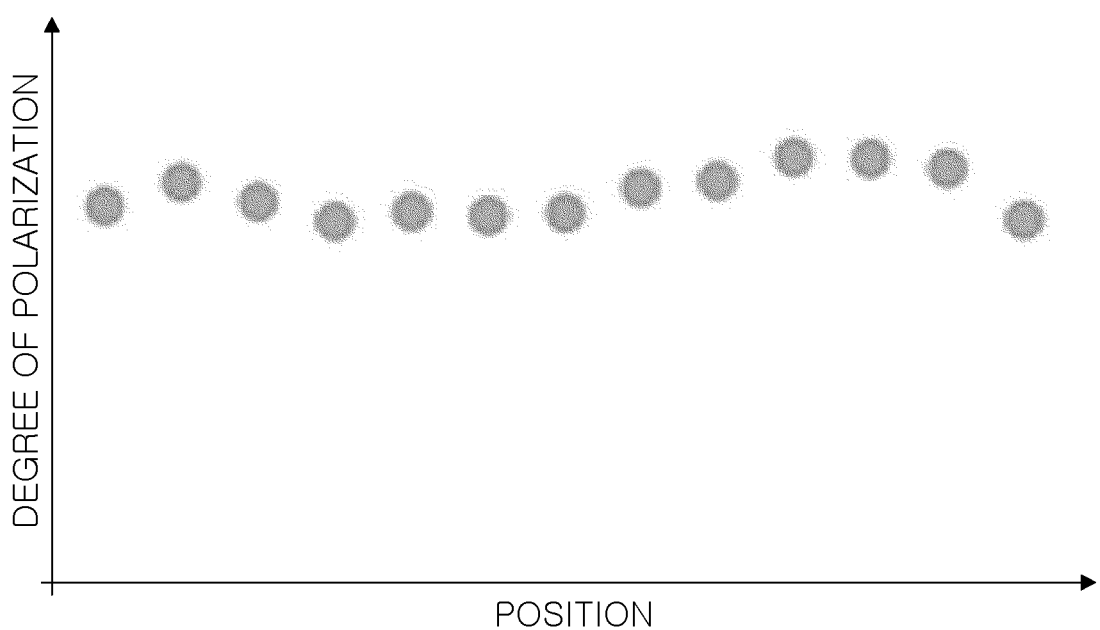

FIGS. 21A to 21D may illustrate degrees of polarization obtained by processing the original image by the control unit at different azimuths. For example, FIG. 21A may be a graph illustrating the degree of polarization calculated by the control unit at an azimuth of 0 degrees for each of the original images corresponding to 13 positions in which light is reflected. FIGS. 21B, 21C, and 21D may represent degrees of polarization calculated by the control unit at azimuths of 45 degrees, 90 degrees, and 135 degrees, respectively.

For example, structures formed in each of 13 positions included in the sample may have different critical dimensions. However, even though the structures have different critical dimensions in each of the 13 positions, it may be difficult to distinguish the difference in critical dimensions at a portion of azimuths. For example, at an azimuth of 135 degrees, a difference in degrees of polarization corresponding to the 13 positions, respectively, may be relatively small, and accordingly, it may be difficult to accurately determine a critical dimension only with a degree of polarization obtained at an azimuth of 135 degrees.

However, in an example embodiment, as described above, the image sensor may generate an original image representing the interference pattern of polarization components at all azimuths by imaging once. Accordingly, as illustrated in FIGS. 21A to 21D, since the critical dimension may be determined with reference to the degrees of polarization at each of the different azimuths, the critical dimension may be swiftly and accurately determined.

Figure 22A:
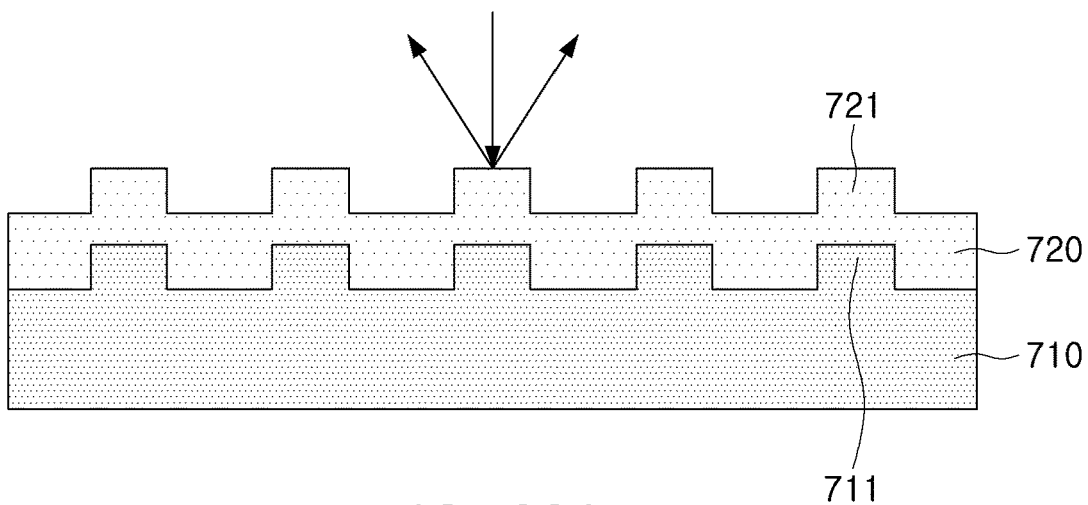
FIGS. 22A to 22C are diagrams illustrating a method of operating a semiconductor measurement apparatus according to an example embodiment of the present disclosure.
Figure 22B:
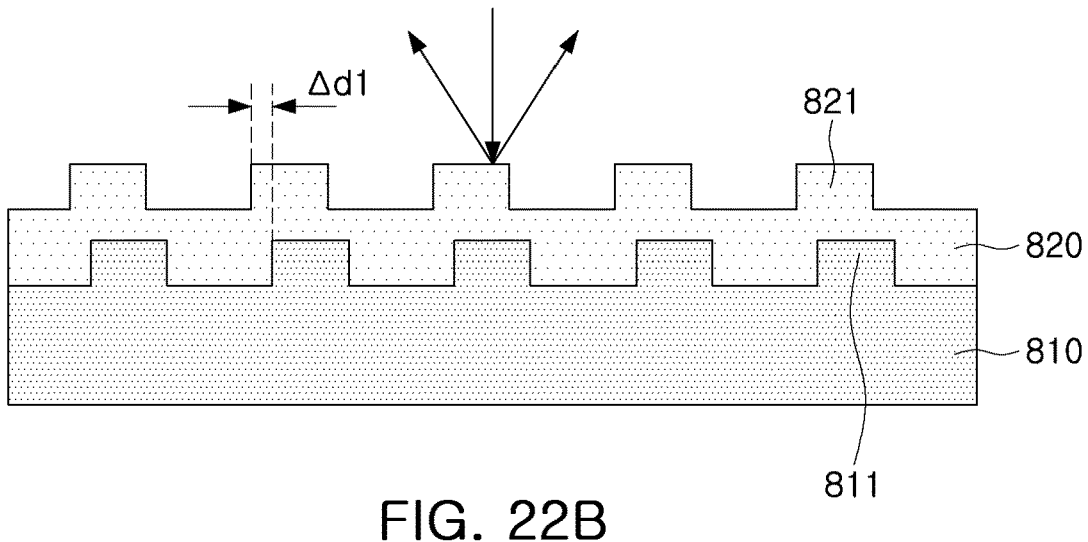
Figure 22C:
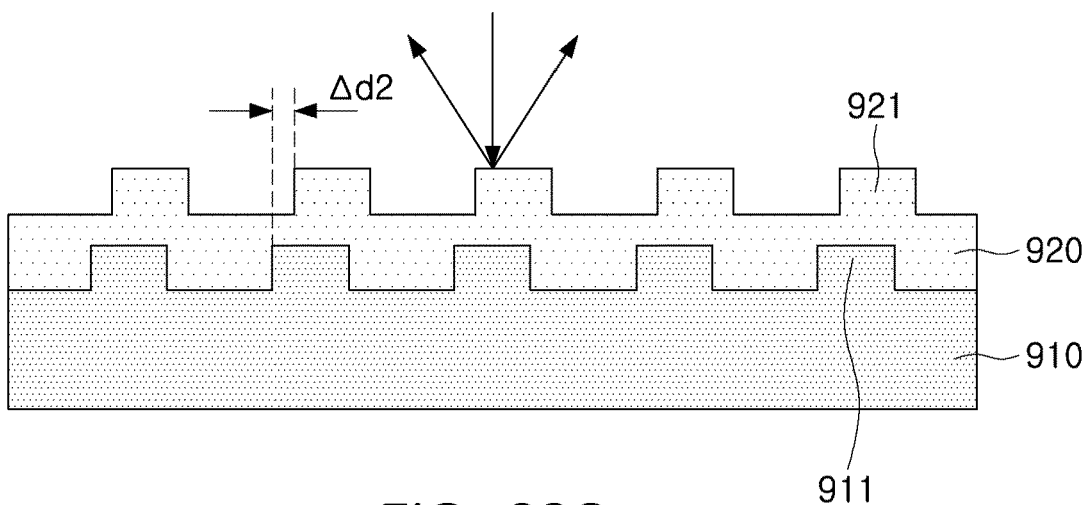

FIGS. 22A to 22C are diagrams illustrating a method of operating a semiconductor measurement apparatus according to an example embodiment.

Referring to FIGS. 22A to 22C, an overlay key for determining the alignment state of patterns formed by a semiconductor process may be formed on a sample for which a critical dimension is measured using a semiconductor measurement apparatus according to an example embodiment. First, referring to FIG. 22A, the sample may include a first layer 710 and a second layer 720 stacked on each other, and first structures 711 may be formed on the first layer 710 and the second structures 721 may be formed on the second layer 720. The first structures 711 and the second structures 721 may be formed in a predetermined pattern, and in the example embodiment illustrated in FIG. 22A, the first structures 711 and the second structures 721 may be precisely aligned without being offset in a specific direction (e.g., horizontal direction).

Differently from the above example embodiment, in the example embodiment illustrated in FIG. 22B, the first layer 810 and the second layer 820 included in the sample may not be precisely aligned. Referring to FIG. 22B, the first structures 811 of the first layer 810 and the second structures 821 of the second layer 820 may be offset in the leftward direction. For example, as compared to the example embodiment illustrated in FIG. 22A, in the example embodiment illustrated in FIG. 22B, the second structures 821 may be disposed adjacent to the left side by a predetermined first offset Δd1 with respect to the first structures 811.

In the example embodiment illustrated in FIG. 22C, the first structures 911 of the first layer 910 and the second structures 921 of the second layer 920 included in the sample may be offset in the rightward direction. For example, as compared to the example embodiment illustrated in FIG. 22A, in the example embodiment illustrated in FIG. 22C, the second structures 921 may be disposed adjacent to the left side by a predetermined second offset Δd2 with respect to the first structures 911.

In an example embodiment, the alignment state of the structures stacked on each other may be determined using the elements of the Mueller matrix obtained by processing multi-interference images of the polarization components of light reflected by the sample, rather than using an intensity difference and a phase difference between the polarization components of light reflected by the sample, which will be described with reference to FIG. 23.

Figure 23:
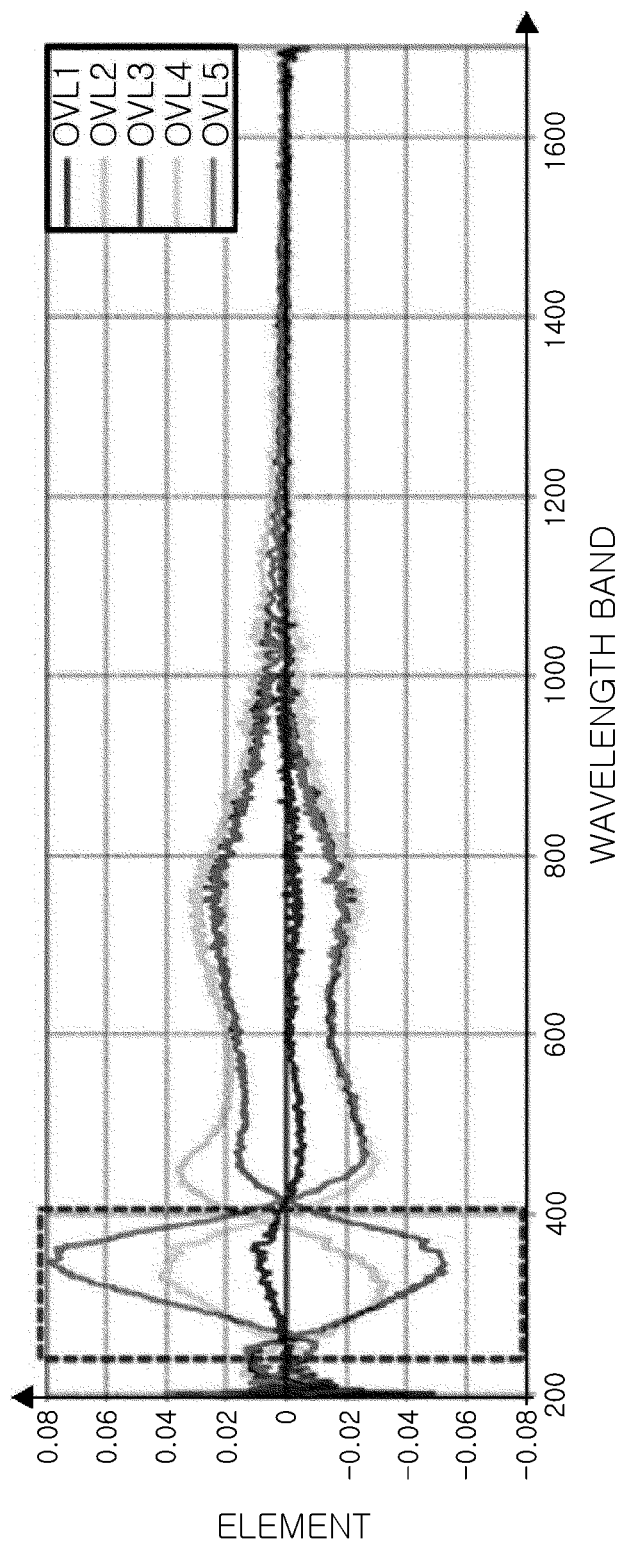
FIG. 23 is a diagram illustrating a method of operating a semiconductor measurement apparatus according to an example embodiment of the present disclosure.

FIG. 23 is a diagram illustrating a method of operating a semiconductor measurement apparatus according to an example embodiment.

The graph illustrated in FIG. 23 may be a graph illustrating the distribution of at least one element selected from the Mueller matrix according to a wavelength band. For example, the graph illustrated in FIG. 23 may be a graph in which a sum of M23 and M32 among the elements of the Mueller matrix is represented in the form of spectral data according to a wavelength band. Referring to FIG. 23, in each of five embodiments OVL1-OVL5 having different overlay characteristics, spectral data may represent different distributions.

For example, in the example embodiment illustrated in FIG. 23, the first embodiment OVL1 may correspond to a state in which structures included in each of a plurality of layers stacked on each other do not have an offset. In other words, the first embodiment OVL1 may correspond to the example embodiment illustrated in FIG. 22A among the example embodiments described with reference to FIGS. 22A to 22C.

Meanwhile, the second embodiment OVL2 and the third embodiment OVL3 may correspond to a state in which structures included in each of the plurality of layers stacked on each other are offset in the first direction. For example, the second embodiment OVL2 may correspond to the same alignment state as in the example embodiment described above with reference to FIG. 22B. The fourth embodiment OVL4 and the fifth embodiment OVL5 may correspond to a state in which the structures stacked on each other are offset in a second direction opposite to the first direction. For example, the fourth embodiment OVL4 may correspond to the example embodiment described above with reference to FIG. 22C.

Referring to FIG. 23, it may be difficult to distinguish the first to fifth embodiments OVL1-OVL5 from each other with spectral data of a specific wavelength band. For example, when elements of the Mueller matrix are determined from an original image obtained by irradiating a sample with light in a wavelength band of 1000 nm or more, the first to fifth embodiments OVL1-OVL5 may not be distinguished from each other based on the spectral data as illustrated in FIG. 23.

Also, it may be difficult to distinguish a portion of the example embodiments in a specific wavelength band. For example, when it is assumed that the sample is irradiated with light in a wavelength band of 400 nm or more and 1000 nm or less, the second embodiment OVL2 and the third embodiment OVL3 may not be distinguished from each other, or the fourth embodiment OVL4 and the fifth embodiment OVL5 may not be distinguished from each other.

The entirety of the first to fifth embodiments OVL1-OVL5 may be distinguished from the elements of the Mueller matrix obtained by irradiating the sample with light in a wavelength band of around 300 nm. Referring to FIG. 23, the sum of M23 and M32 obtained by irradiating light in a wavelength band of around 300 nm from the sample may have a very large difference depending on the overlay characteristics of the structures included in the sample. Accordingly, a wavelength band around 300 nm may be defined as a wavelength band having a very high sensitivity to the overlay characteristics of the corresponding sample. The control unit of the semiconductor measurement apparatus may determine the elements of the Mueller matrix from the original image obtained while irradiating the sample with light in the wavelength band around 300 nm, and may determine the overlay state of the structures formed in the region in which the light is reflected by the sample by referring to the sum of a portion of the elements selected from the elements, such as, for example, the sum of M23 and M32.

The method of operating the semiconductor measurement apparatus described with reference to FIG. 23 is not limited to the determination of overlay. For example, the distribution according to a wavelength band of at least one element among the plurality of elements included in the Mueller matrix may have high sensitivity in a specific wavelength band with respect to a selected critical dimension among critical dimensions of a structure formed on a sample. When the selected critical dimension to be measured in the structure is determined, the control unit of the semiconductor measurement apparatus may select one or more elements having the highest sensitivity for the selected critical dimension from the Mueller matrix, may select a wavelength band in which the selected element may have the highest sensitivity for the selected critical dimension, and may irradiate light of the selected wavelength band to the sample. Accordingly, the selected critical dimension may be swiftly and accurately determined.

Also, when each of the elements does not have high sensitivity to the selected critical dimension, the selected critical dimension may be determined using the sum of two or more elements as illustrated in FIG. 23. In an example embodiment, in addition to the intensity difference and phase difference between the polarization components, by using various measurement parameters which may represent the characteristics of the polarization components of light, such as the degree of polarization and the elements included in the Mueller matrix, each of the various critical dimensions representing the shape and structure of the structures may be accurately determined despite the interaction between the critical dimensions.

According to the aforementioned example embodiments, by obtaining an original image corresponding to an azimuth of 0 degrees to 360 degrees by imaging once, and extracting the images of the regions in which a peak due to interference between light polarization components appears from the original image, a plurality of elements representing the polarization components of light may be generated. Using a plurality of elements representing various parameters such as a degree of polarization in addition to a difference in intensity and a phase difference between polarization components of light, a critical dimension may be accurately determined. Also, the critical dimension to be measured may be accurately determined regardless of the interaction between the critical dimensions in the process.

While the example embodiments have been illustrated and described above, it will be apparent to those skilled in the art that modifications and variations could be made without departing from the scope of the present disclosure as defined by the appended claims.

What is claimed is:

1. A semiconductor measurement apparatus, comprising:
    an illumination unit including a light source and at least one illumination polarization element disposed on a path of light emitted by the light source;
    a light receiving unit including at least one light-receiving polarization element disposed on a path of light passing through the at least one illumination polarization element and reflected by a sample, and an image sensor positioned to receive light passing through the at least one light-receiving polarization element and configured to output an original image; and
    a control unit configured to determine, by processing the original image, a selected critical dimension among critical dimensions of a structure included in a region of the sample to which light is incident,
    wherein the control unit is configured to obtain a plurality of sample images by selecting regions of the original image in which a peak due to interference appears, to determine a plurality of elements included in a Mueller matrix using the plurality of sample images, and to determine the selected critical dimension based on the plurality of elements.

2. The semiconductor measurement apparatus of claim 1, wherein the illumination unit includes a first illumination polarization element and a second illumination polarization element, and
    wherein the light receiving unit includes a first light-receiving polarization element and a second light-receiving polarization element.

3. The semiconductor measurement apparatus of claim 1, wherein the control unit is configured to transform the original image into a frequency domain and extract a plurality of peak images corresponding to regions in which peaks appear due to interference between polarization components passing through the at least one illumination polarization element and the at least one light-receiving polarization element, and
    wherein the plurality of sample images are obtained by frequency-inverse transformation of each of the plurality of peak images.

4. The semiconductor measurement apparatus of claim 3, wherein each of the plurality of sample images corresponds to each of the regions in which the peak appears, and a peak appearing in each of the regions is displayed in a center.

5. The semiconductor measurement apparatus of claim 1, wherein the control unit is configured to calculate a measurement parameter for determining the selected critical dimension based on the plurality of elements, and
    wherein the selected critical dimension is determined by comparing the measurement parameter with a reference parameter included in library data.

6. The semiconductor measurement apparatus of claim 5, wherein the measurement parameter includes a difference in intensity between polarization components of light incident to the image sensor, a phase difference between the polarization components, and a degree of polarization (DOP).

7. The semiconductor measurement apparatus of claim 1, wherein each of the plurality of elements includes data in an image format, and
    wherein the control unit is configured to determine the selected critical dimension by comparing the plurality of elements with reference image data stored in library data.

8. The semiconductor measurement apparatus of claim 1, further comprising:
    an objective lens disposed in a path of light incident to the sample and a path of light reflected from the sample,
    wherein a numerical aperture of the objective lens is 0.95 or more and less than 1.0.

9. The semiconductor measurement apparatus of claim 8, wherein an incidence angle of light reflected by the sample and incident to the objective lens is 0 degrees or more and 85 degrees or less.

10. The semiconductor measurement apparatus of claim 8, wherein a surface of the image sensor is disposed in a conjugate position with respect to a position of a back focal plane of the objective lens.

11. The semiconductor measurement apparatus of claim 1, wherein the control unit is configured to determine the selected critical dimension by specifying an azimuth, an incidence angle, and a wavelength band of light reflected by the sample and incident to the image sensor and extracting data corresponding to the azimuth, the incidence angle, and the wavelength band from at least one of the plurality of elements.

12. The semiconductor measurement apparatus of claim 1, wherein the control unit is configured to select at least one element having a highest sensitivity for the selected critical dimension among the plurality of elements, and to determine the selected critical dimension based on the at least one element.

\* \* \* \* \*